(12) United States Patent
Mauritz et al.

(10) Patent No.: US 12,530,387 B2
(45) Date of Patent: Jan. 20, 2026

(54) CONTENT GENERATION SERVICE FOR USER INTERFACE OF A CONTENT COLLABORATION PLATFORM

(71) Applicant: Atlassian Pty Ltd., Sydney (AU)

(72) Inventors: Andre Mauritz, Sydney (AU); Bright Geng, Sydney (AU); Andres Hernandez, Sydney (AU); Jake Coppinger, Sydney (AU); Tong Li, Sydney (AU); Matthew Merrison, Sydney (AU)

(73) Assignee: ATLASSIAN PTY LTD., Sydney (AU)

( * ) Notice: Subject to any disclaimer, the term of this patent is extended or adjusted under 35 U.S.C. 154(b) by 207 days.

(21) Appl. No.: 18/399,638

(22) Filed: Dec. 28, 2023

(65) Prior Publication Data

US 2025/0217399 A1    Jul. 3, 2025

(51) Int. Cl.
*G06F 3/0482* (2013.01)
*G06F 16/34* (2019.01)

(52) U.S. Cl.
CPC .......... *G06F 16/345* (2019.01); *G06F 3/0482* (2013.01)

(58) Field of Classification Search
CPC ..................... G06F 16/345; G06F 3/048–05
See application file for complete search history.

(56) References Cited

U.S. PATENT DOCUMENTS

| | | | |
|---|---|---|---|
| 11,416,319 B1* | 8/2022 | Katahanas | G06F 3/0483 |
| 12,038,958 B1* | 7/2024 | Soubbotin | G06F 16/335 |
| 12,093,299 B1* | 9/2024 | Jayawardena | G06F 40/166 |
| 2014/0359490 A1* | 12/2014 | Ma | G06F 16/9535 715/760 |
| 2019/0042551 A1* | 2/2019 | Hwang | G06F 40/289 |
| 2019/0332719 A1* | 10/2019 | Keskar | G06F 40/30 |
| 2023/0376515 A1* | 11/2023 | Tanikella | G06Q 10/101 |
| 2024/0303568 A1* | 9/2024 | Wilde | G06F 3/0483 |
| 2024/0346064 A1* | 10/2024 | Warnock | G06F 16/4393 |
| 2025/0036861 A1* | 1/2025 | Goshen | G06F 40/205 |

\* cited by examiner

*Primary Examiner* — Daniel Rodriguez
(74) *Attorney, Agent, or Firm* — Brownstein Hyatt Farber Schreck, LLP

(57) ABSTRACT

Embodiments described herein relate to systems and methods for content summary generation within a content collaboration system. A graphical user interface for a platform of the system may include selectable graphical objects, which may contain a portion of content obtained from target content, and other selectable elements and graphics. A user may be provided with an input to request a summary of the target content. The system may generate a prompt and provide to a generative output engine instructions to prepare such summary, and generate within the graphical user interface a summary including natural language. The summary may be a summary of a page, a set of messages, a list of actions, key decisions, or items and summaries related to the target content. Processing may include populating the summary with system-specific mentions, links, tables, video, audio, and so on, which may be specific to permissions for the user.

20 Claims, 16 Drawing Sheets

≫ NORMAL TEXT ∨ | B | I | ⋮ | ≡ ∨ | ≡ | ⊞ | ⊕ | @ | ⊘ | ⊠ | ⊡ | + ∨ | Q | ⊕ | ? | ▦ | PUBLISH | CLOSE | •••

DOCUMENTATION PLATFORM PAGE

(JD) OWNED BY JOHN DOE • •••
LAST UPDATED: ABOUT AN HOUR AGO • 1 MIN READ • ⚇ 3 PEOPLE VIEWED • BYLINE KEYBOARD SHORTCUT (DEVELOPMENT)
• CC ON PAGE NOTES (UI KIT) (DEVELOPMENT)

EXAMPLE PAGE CONTENT

- ▤ HUMAN RESOURCES - PERSONNEL COMPLAINT HISTORY ~212
- ▤ PAY EXPLAINABILITY UPDATE: INTRODUCING SALARY REFERENCE POINTS (SRP) AND 1% OF SRP ~214
- # #SXP-INNO-PROJECT-INCOMING-LINKS ~216
- ▤ SLACK MESSAGE FROM JOHN DOE IN #SOCIAL-SYD ~218
- ▤ SUPERCHARGE CONFLUENCE SLIDES ~220
- ☑ SC-1: HOW TO SUPERCHARGE CONFLUENCE [IN PROGRESS] ~222
- ▤ SUPERCHARGING CONFLUENCE CLOUD FOR YOUR ENTIRE ORGANIZATION (1) KEY ~224
- ☑ SUPERCHARGE CONFLUENCE ~226

204

⎫
⎬ 206
⎭

? FEEDBACK

SUMMARY

ⓘ TL;DR

Lorem ipsum dolor sit amet, consectetuer adipiscing elit, sed diam nonummy nibh euismod tincidunt ut laoreet dolore magna aliquam erat volutpat. @FIRSTNAME LASTNAME ullamcorper suscipit lobortis nisl ut aliquip ex ea commodo consequat. Duis autem vel eum iriure dolor in hendrerit in vulputate velit esse molestie consequat, vel illum dolore eu feugiat nulla facilisis at vero eros et accumsan et iusto odio dignissim qui blandit praesent luptatum zzril delenit augue duis dolore te feugait nulla facilisi.

Lorem ipsum dolor sit amet, cons ectetuer adipiscing elit, @TEAM sed diam nonummy nibh euismod tincidunt ut laoreet dolore magna aliquam erat volutpat. Ut wisi enim ad minim veniam, quis nostrud exerci tation ullamcorper suscipit lobortis nisl ut aliquip ex ea commodo consequat.

Lorem ipsum dolor sit amet, consectetuer adipiscing elit, sed diam nonummy nibh euismod tincidunt ut laoreet dolore magna aliquam erat volutpat. Ut wisi enim ad minim veniam, quis nostrud exerci tation ullamcorper suscipit lobortis nisl ut aliquip ex ea commodo consequat.

ADDITIONAL SELECTABLE GRAPHICAL OBJECT — 248

Duis autem vel eum iriure dolor in hendrerit in vulputate velit esse molestie consequat, vel illum dolore eu feugiat nulla facilisis at vero eros et accumsan et iusto odio dignissim qui blandit praesent luptatum zzril delenit augue duis dolore te feugait nulla facilisi.

*FIG. 2E*

≡ NORMAL TEXT ∨ | B I ⋯ | ≡ ∨ | ≡ ⊞ ⊠ 𝒫 ☒ @ ⊙ ⊞ ▦ | + ∨ | | Q ⊕ ? ▦ | PUBLISH | CLOSE | ⋯

EXAMPLE PAGE CONTENT

*JUST HOVER OVER A LINK AND CLICK THE INTELLIGENCE BUTTON* 🖉

☑ ITSAMPLE-16:VPN NOT WORKING [PENDING]

— 302

☑ ITSAMPLE-16:VPN NOT WORKING    ⬚    ✕

(JD)  [PENDING]  ⬆ HIGHEST

SUMMARIZED BY INTELLIGENCE:

- 'AVOCADO ORGANICS', ONE OF OUR LARGEST CUSTOMERS, CAN'T CONNECT TO THEIR VPN. THIS HAS BEEN A RECENT ISSUE AND IS BLOCKING THEM FROM GETTING CRITICAL WORK FLOWS DONE.

- [@SUSAN JONES] HAS INVESTIGATED THIS AND FOUND THAT IT'S LIKELY RELATED TO THE LATEST 'VPN WILDCARD' FEATURE, WHICH WAS RELEASED IN JULY.

- LOOKING AT OVERALL IMPACT, SIZE OF THE CUSTOMER, AND LIKELY STRAIGHTFORWARD FIX, IT IS SUGGESTED TO PRIORITIZE FIXING THIS ISSUE IN THE NEAR FUTURE.

- THE FEATURE RELEASE THAT CAUSED THE ISSUE CAN BE READ UP ON HERE:
▤ VPN WILDCARDS: MANAGE DOMAINS

SUGGESTED ACTIONS

▤ CREATE NEW PAGE        ☑ CREATE NEW TICKET        ▤ CREATE NEW BOARD
 CREATE A NEW PAGE FROM THIS SUMMARY

✱                                                                           ⤴ ✕

304 — (box around ITSAMPLE-16:VPN NOT WORKING [PENDING])
306 — ITSAMPLE-16:VPN NOT WORKING
308 — (JD) [PENDING] ⬆ HIGHEST
312 — @SUSAN JONES
310 — SUMMARIZED BY INTELLIGENCE content
314 — VPN WILDCARDS: MANAGE DOMAINS
316 — CREATE NEW PAGE
318 — ✱

FIG. 3

SUPERCHARGE CONFLUENCE RESOURCES

SUPERCHARGE CONFLUENCE SLIDES
THIS PAGE IS WITHIN THE HOME SPACE

※ CONFLUENCE

SC-1: HOW TO SUPERCHARGE CONFLUENCE [IN PROGRESS]
UPDATED 6 MINUTES AGO

JIRA

SUPERCHARGING CONFLUENCE CLOUD FOR YOUR ENTIRE ORGANIZATION (1).KEY  [DOWNLOAD] [PREVIEW]
UPDATED 2 MONTHS AGO

CLOUD STORAGE

SUPERCHARGE CONFLUENCE
UPDATED 18 MINUTES AGO

DRIVE STORAGE

SUPERCHARGE CONFLUENCE
UPDATED BY B 2 MINUTES AGO

LOCAL STORAGE

CONTENT GENERATION SERVICE FOR USER INTERFACE OF A CONTENT COLLABORATION PLATFORM

TECHNICAL FIELD

Embodiments described herein relate to multitenant services of collaborative work environments and, in particular, to systems and methods for content generation in content collaboration platforms.

BACKGROUND

An organization can establish a collaborative work environment by self-hosting, or providing its employees with access to, a suite of discrete software platforms or services to facilitate cooperation and completion of work. In many cases, the organization may also define policies outlining best practices for interacting with, and organizing data within, each software platform of the suite of software platforms.

Often internal best practice policies require employees to thoroughly document completion of tasks, assignment of work, decision points, and so on. Such policies additionally often require employees to structure and format documentation in particulars ways, to copy data or status information between multiple platforms at specific times, or to perform other rigidly defined, policy-driven, tasks. Some platforms provide linked content to other content items or resources. However, it can be difficult to determine the relevance or subject matter of linked content without having to load the entire content item and browse the content manually. The system and techniques described herein are directed to systems and interfaces for handling linked content in a collaboration platform.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

FIG. 2A depicts an example frontend interface that supports content generation in content collaboration platforms, in accordance with aspects described herein.

FIG. 2C depicts an example frontend interface that supports content generation in content collaboration platforms, in accordance with aspects described herein.

FIG. 2D depicts an example frontend interface that supports content generation in content collaboration platforms, in accordance with aspects described herein.

FIG. 2E depicts an example frontend interface that supports content generation in content collaboration platforms, in accordance with aspects described herein.

FIG. 3 depicts an example frontend interface that supports content generation in content collaboration platforms, in accordance with aspects described herein.

FIG. 4 depicts an example frontend interface that supports content generation in content collaboration platforms, in accordance with aspects described herein.

FIG. 5 depicts an example frontend interface that supports content generation in content collaboration platforms, in accordance with aspects described herein.

The use of the same or similar reference numerals in different figures indicates similar, related, or identical items.

Figure 1:
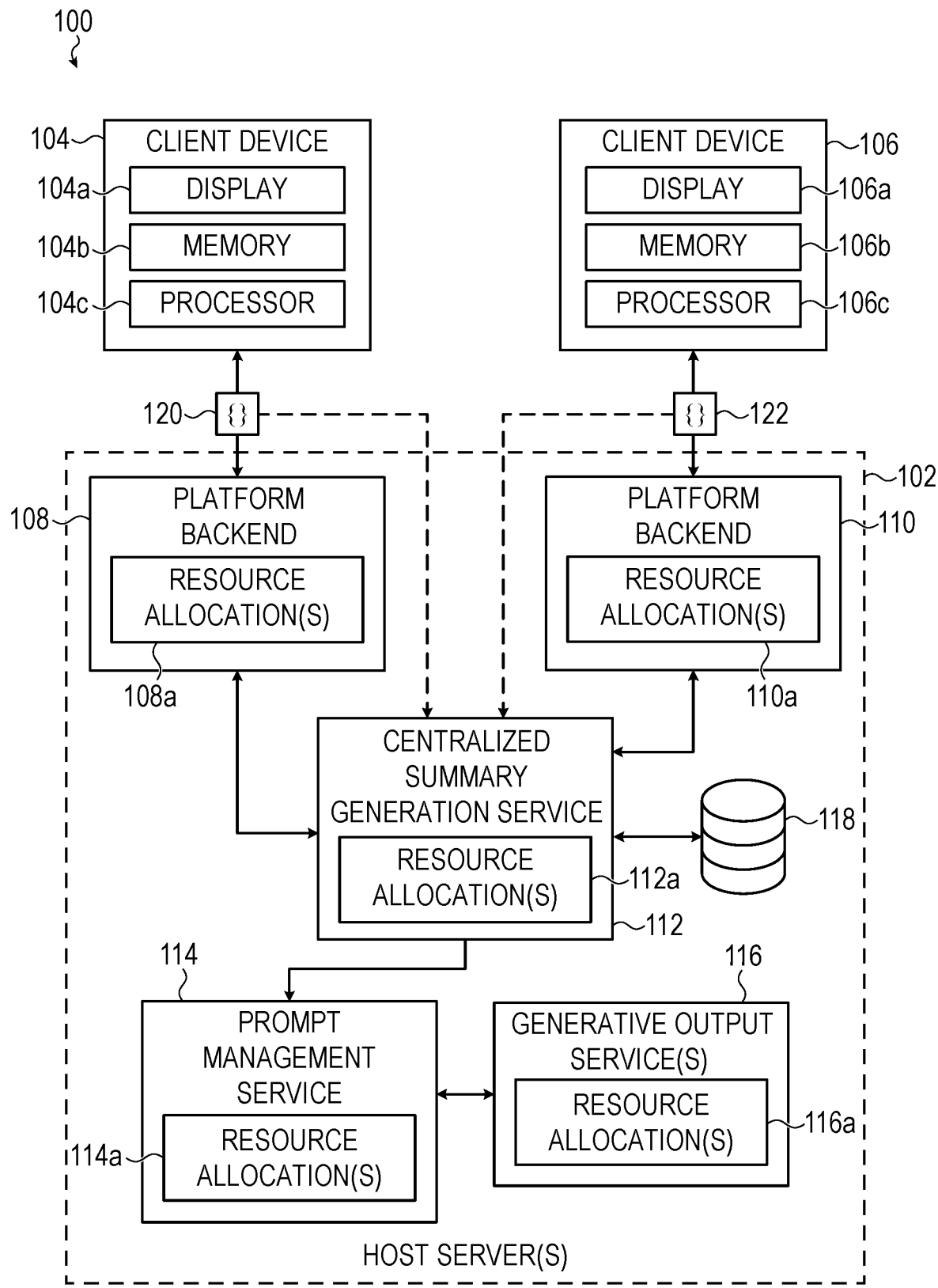
FIG. 1 depicts a simplified diagram of a system, such as described herein that can include and/or may receive input from a generative output engine.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to systems, devices, and methods for content generation, including summary generation within selectable graphical objects, in content collaboration platforms, such as documentation systems, issue tracking systems, project management platforms, scheduling systems, software development platforms, file sharing systems, video sharing platforms, video conferencing platforms, customer relation management systems, and the like.

Collaboration platforms can be used to generate, store, and organize user-generated content. As described herein, a collaboration platform or service may include an editor that is configured to receive user input and generate user-generated content that is saved as a content item. The terms "collaboration platform" or "collaboration service" may be used to refer to a documentation platform or service configured to manage electronic documents or pages created by the system users, an issue tracking platform or service that is configured to manage or track issues or tickets in accordance with an issue or ticket workflow, a source-code management platform or service that is configured to manage source code and other aspects of a software product, a manufacturing resource planning platform or service configured to manage inventory, purchases, sales activity or other aspects of a company or enterprise. In some instances, the functionality described herein may be adapted to multiple platforms or adapted for cross-platform use, through the use of a common or unitary service, such as a summary generation service. For example, the functionality described in an example may be provided with respect to a particular collaboration platform, but the same or similar functionality can be extended to other platforms by using the same service. Also, as described above a set of host services or platforms may be accessed through a common gateway or using a common authentication scheme, which may allow a user to transition between platforms and access platform-specific content without having to enter user credentials for each platform.

A collaboration platform may utilize mechanisms such as selectable graphical objects, to link from one portion of the collaboration platform to another portion of the collaboration platform, or between one platform and content of a second platform. The selectable graphical objects may contain a portion of content obtained from target content, and other selectable elements and graphics. A user may hover over the selectable graphical object (e.g., in one content) to cause generation of a display of the portion of content and other elements and graphics. However, the portion of content may be inadequate for a user to obtain desired information about the target content, or other determine whether to navigate to the target content to review the content. As further described herein, a user who has hovered over the selectable graphical objects is presented with a button or other input to request a summary of the target content to be populated into the selectable graphical object. Upon receiving the input, the centralized summary generation service can prepare a prompt for a generative output engine based on the target content, provide the prompt to the generative output engine, receive a response, and cause generation of a summary within the selectable graphical object based on the response. In some examples, a user can ask questions of or otherwise query the generative output engine regarding the target content, the answers to which can be displayed along with, or instead of, the summary within the selectable graphical object.

FIG. 1 depicts a simplified diagram of a system, such as described herein that can include and/or may receive input from a generative output engine as described herein. The system 100 is depicted as implemented in a client-server architecture, but it may be appreciated that this is merely one example and that other communications architectures are possible.

In particular the system 100 includes a set of host servers 102 which may be one or more virtual or physical computing resources (collectively referred in many cases as a "cloud platform"). In some cases, the set of host servers 102 can be physically collocated or in other cases, each may be positioned in a geographically unique location.

The set of host servers 102 can be communicably coupled to one or more client devices; two example devices are shown as the client device 104 and the client device 106. The client devices 104, 106 can be implemented as any suitable electronic device. In many embodiments, the client devices 104, 106 are personal computing devices such as desktop computers, laptop computers, or mobile phones.

The set of host servers 102 can be supporting infrastructure for one or more backend applications, each of which may be associated with a particular software platform, such as a documentation platform or an issue tracking platform. Other examples information technology system management (ITSM) systems, chat platforms, messaging platforms, and the like. These backends can be communicably coupled to a generative output engine that can be leveraged to provide unique intelligent functionality to each respective backend. For example, the generative output engine can be configured to receive user prompts, such as described above, to modify, create, or otherwise perform operations against content stored by each respective software platform.

By centralizing access to the generative output engine in this manner, the generative output platform can also serve as an integration between multiple platforms. For example, one platform may be a documentation platform and the other platform may be an issue tracking system. In these examples, a user of the documentation platform may input a prompt requesting a summary of the status of a particular project documented in a particular page of the documentation platform. A comprehensive continuation/response to this summary request may pull data or information from the issue tracking system as well.

A user of the client devices may trigger production of generative output in a number of suitable ways. One example is shown in FIG. 1. In particular, in this embodiment, each of the software platforms can share a common feature, such as a common centralized editor rendered in a frame of the frontend user interfaces of both platforms.

Turning to FIG. 1, a portion of the set of host servers 102 can be allocated as physical infrastructure supporting a first platform backend 108 and a different portion of the set of host servers 102 can be allocated as physical infrastructure supporting a second platform backend 110.

The two different platforms may be instantiated over physical resources provided by the set of host servers 102. Once instantiated, the first platform backend 108 and the second platform backend 110 can each communicably couple to a centralized summary generation service 112.

The centralized summary generation service 112 can be configured to cause rendering of a frame within respective frontends of each of the first platform backend 108 and the second platform backend 110. In this manner, and as a result of this construction, each of the first platform and the second platform present a consistent user content editing experience.

More specifically, the centralized summary generation service 112 may provide a mechanism to request and obtain summaries of content through selectable graphical objects from various platforms in the multiplatform environment, and communicate with the generative output engine to fulfill the summary requests and provide responses from the generative output engine back within the selectable graphical objects. As a result of this centralized architecture, multiple platforms in a multiplatform environment can leverage the features of the generative output engine via the selectable graphical object, regardless of the platform of the system 100 in which the selectable graphical object resides. This provides a consistent experience to users across platforms while simplifying processes of updating or otherwise modifying the service to the generative output engine.

For example, in one embodiment, a user in a multiplatform environment may use and operate a documentation platform and an issue tracking platform. In this example, both the issue tracking platform and the documentation platform may be associated with a respective frontend and a respective backend. Each platform may be additionally communicably and/or operably coupled to a centralized summary generation service 112 that can be called by each respective frontend whenever it is required to present the user of that respective frontend with an interface to edit text.

For example, the documentation platform's frontend or the issue tracking platform's fronted may call upon the centralized summary generation service 112 to interact with a generative output engine to obtain and provide a summary of target content referenced by a selectable graphical object when a user of the documentation platform or issue tracking platform requests the summary via a button or other input of the selectable graphical object.

Similarly, the documentation platform's frontend or the issue tracking platform's frontend may call upon the centralized summary generation service 112 to interact with a generative output engine to obtain and provide a response to a question or query regarding the target content referenced by a selectable graphical object when a user of the documentation platform provides a question or query regarding the target content via an input of the selectable graphical object.

In these examples, the centralized summary generation service 112 can parse text input provided by users of the documentation platform and/or the issue tracking platform, monitoring for summary request inputs or questions provided via selectable graphical objects.

In addition, as a result of the architectures described herein, services supporting the centralized summary generation service 112 can be extended to include additional features and functionality that can automatically be leveraged by any further platform that incorporates selectable graphical objects, and/or otherwise integrates with the centralized summary generation service 112 itself.

The generative output engine service may be hosted over the host servers 102 or, in other cases, may be a software instance instantiated over separate hardware. In some cases, the generative engine service may be a third party service that serves an API interface to which one or more of the host services and/or preconditioning service can communicably couple.

The generative output engine can be configured as described above to provide any suitable output, in any suitable form or format. Examples include content to be added to user-generated content, API request bodies, replacing user-generated content, and so on.

More generally and broadly, the embodiments described herein refence systems and methods for generating a summary of target content within selectable graphical objects sharing user interface elements rendered by a centralized summary generation service 112 and features thereof, between different software platforms in an authenticated and secure manner.

The first platform backend 108 can be configured to communicably couple to a first platform frontend instantiated by cooperation of a memory and a processor of the client device 104. Once instantiated, the first platform frontend can be configured to leverage a display of the client device 104 to render a graphical user interface so as to present information to a user of the client device 104 and so as to collect information from a user of the client device 104. Collectively, the processor, memory, and display of the client device 104 are identified in FIG. 1 as the client devices resources 104a-104c, respectively.

As with many embodiments described herein, the first platform frontend can be configured to communicate with the first platform backend 108 and/or the centralized summary generation service 112. Information can be transacted by and between the frontend, the first platform backend 108 and the centralized summary generation service 112 in any suitable manner or form or format. In many embodiments, as noted above, the client device 104 and in particular the first platform frontend can be configured to send an authentication token 120 along with each request transmitted to any of the first platform backend 108 or the centralized summary generation service 112 or the preconditioning service or the generative output engine.

Similarly, the second platform backend 110 can be configured to communicably couple to a second platform frontend instantiated by cooperation of a memory and a processor of the client device 106. Once instantiated, the second platform frontend can be configured to leverage a display of the client device 106 to render a graphical user interface so as to present information to a user of the client device 106 and so as to collect information from a user of the client device 106. Collectively, the processor, memory, and display of the client device 106 are identified in FIG. 1 as the client devices resources 106a-106c, respectively.

As with many embodiments described herein, the second platform frontend can be configured to communicate with the second platform backend 110 and/or the centralized summary generation service 112. Information can be transacted by and between the frontend, the second platform backend 110 and the centralized summary generation service 112 in any suitable manner or form or format. In many embodiments, as noted above, the client device 106 and in particular the second platform frontend can be configured to send an authentication token 122 along with each request transmitted to any of the second platform backend 110 or the centralized summary generation service 112.

As a result of these constructions, the centralized summary generation service 112 can provide uniform feature sets to users of either the client device 104 or the client device 106.

As noted above, the centralized summary generation service 112 ensures that common features are available to frontends of different platforms. One such class of features provided by the centralized summary generation service 112 invokes output of a generative output engine of a service such as the generative output service 116.

For example, as noted above, the generative output service 116 can be used to generate content, supplement content, and/or generate API requests or API request bodies that cause one or both of the first platform backend 108 or the second platform backend 110 to perform a task. In some cases, an API request generated at least in part by the generative output service 116 can be directed to another system not depicted in FIG. 1. For example, the API request can be directed to a third-party service (e.g., referencing a callback, as one example, to either backend platform) or an integration software instance. The integration may facilitate data exchange between the second platform backend 110 and the first platform backend 108 or may be configured for another purpose.

As with other embodiments described herein, the prompt management service 114 can be configured to receive user input (provided via a graphical user interface of the client device 104 or the client device 106) from the centralized summary generation service 112. The user input may include a prompt to be continued by the generative output service 116.

The prompt management service 114 can be configured to modify the user input, to supplement the user input, select a prompt from a database (e.g., the database 118) based on the user input, insert the user input into a template prompt, replace words within the user input, preform searches of databases (such as user graphs, team graphs, and so on) of either the first platform backend 108 or the second platform backend 110, change grammar or spelling of the user input, change a language of the user input, and so on. The prompt management service 114 may also be referred to herein as herein as an "editor assistant service" or a "prompt constructor." In some cases, the prompt management service 114 is also referred to as a "content creation and modification service."

Output of the prompt management service 114 can be referred to as a modified prompt or a preconditioned prompt. This modified prompt can be provided to the generative output service 116 as an input. More particularly, the prompt management service 114 is configured to structure an API request to the generative output service 116. The API request can include the modified prompt as an attribute of a structured data object that serves as a body of the API request. Other attributes of the body of the API request can include, but are not limited to: an identifier of a particular LLM or generative engine to receive and continue the modified prompt; a user authentication token; a tenant authentication token; an API authorization token; a priority level at which the generative output service 116 should process the request; an output format or encryption identifier; and so on. One example of such an API request is a POST request to a Restful API endpoint served by the generative output service 116. In other cases, the prompt management service 114 may transmit data and/or communicate data to the generative output service 116 in another manner (e.g., referencing a text file at a shared file location, the text file including a prompt, referencing a prompt identifier, referencing a callback that can serve a prompt to the generative output service 116, initiating a stream comprising a prompt, referencing an index in a queue including multiple prompts, and so on; many configurations are possible).

In response to receiving a modified prompt as input, the generative output service 116 can execute an instance of a generative output engine, such as an LLM. As noted above, in some cases, the prompt management service 114 can be configured to specify what engine, engine version, language, language model or other data should be used to continue a particular modified prompt.

The selected LLM or other generative engine continues the input prompt and returns that continuation to the caller, which in many cases may be the prompt management service 114. In other cases, output of the generative output service 116 can be provided to the centralized summary generation service 112 to return to a suitable backend application, to in turn return to or perform a task for the benefit of a client device such as the client device 104 or the client device 106. More particularly, it may be appreciate that although FIG. 1 is illustrated with only the prompt management service 114 communicably coupled to the generative output service 116, this is merely one example and that in other cases the generative output service 116 can be communicably coupled to any of the client device 106, the client device 104, the first platform backend 108, the second platform backend 110, the centralized summary generation service 112, or the prompt management service 114.

In some cases, output of the generative output service 116 can be provided to an output processor or gateway configured to route the response to an appropriate destination. For example, in an embodiment, output of the generative engine may be intended to be prepended to an existing document of a documentation system. In this example, it may be appropriate for the output processor to direct the output of the generative output service 116 to the frontend (e.g., rendered on the client device 104, as one example) so that a user of the client device 104 can approve the content before it is prepended to the document. In another example, output of the generative output service 116 can be inserted into an API request directly to a backend associated with the documentation system. The API request can cause the backend of the documentation system to update an internal object representing the document to be updated. On an update of the document by the backend, a frontend may be updated so that a user of the client device can review and consume the updated content.

In other cases, the output processor/gateway can be configured to determine whether an output of the generative output service 116 is an API request that should be directed to a particular endpoint. Upon identifying an intended or specified endpoint, the output processor can transmit the output, as an API request to that endpoint. The gateway may receive a response to the API request which in some examples, may be directed to yet another system (e.g., a notification that an object has been modified successfully in one system may be transmitted to another system).

More generally, the embodiments described herein and with particular reference to FIG. 1 relate to systems for collecting user input, modifying that user input into a particularly engineered prompt, and submitting that prompt as input to a trained large language model. Output of the LLM can be used in a number of suitable ways In some embodiments, user input can be provided by text input that can be provided by a user typing a word or phrase into an editable dialog box such as a rich text editing frame rendered within a user interface of a frontend application on a display of a client device. For example, the user can type a particular character or phrase in order to instruct the frontend to enter a command receptive mode. In some cases, the frontend may render an overlay user interface that provides a visual indication that the frontend is ready to receive a command from the user. As the user continues to type, one or more suggestions may be shown in a modal UI window.

These suggestions can include and/or may be associated with one or more "preconfigured prompts" that are engineered to cause an LLM to provide particular output. More specifically, a preconfigured prompt may be a static string of characters, symbols and words, that causes—deterministically or pseudo-deterministically—the LLM to provide consistent output. For example, a preconfigured prompt may be "generate a summary of changes made to all documents in the last two weeks." Preconfigured prompts can be associated with an identifier or a title shown to the user, such as "Summarize Recent System Changes." In this example, a button with the title "Summarize Recent System Changes" can be rendered for a user in a UI as described herein. Upon interaction with the button by the user, the prompt string "generate a summary of changes made to all documents in the last two weeks" can be retrieved from a database or other memory, and provided as input to the generative output service 116.

Suggestions rendered in a UI can also include and/or may be associated with one or more configurable or "templatized prompts" that are engineered with one or more fields that can be populated with data or information before being provided as input to an LLM. An example of a templatized prompt may be "summarize all tasks assigned to ${user} with a due date in the next 2 days." In this example, the token/field/variable ${user} can be replaced with a user identifier corresponding to the user currently operating a client device.

This insertion of an unambiguous user identifier can be preformed by the client device, the platform backend, the centralized summary generation service, the prompt management service, or any other suitable software instance. As with preconfigured prompts, templatized prompts can be associated with an identifier or a title shown to the user, such as "Show My Tasks Due Soon." In this example, a button with the title "Show My Tasks Due Soon" can be rendered for a user in a UI as described herein. Upon interaction with the button by the user, the prompt string "summarize all tasks assigned to userl23 with a due date in the next 2 days" can be retrieved from a database or other memory, and provided as input to the generative output service 116.

Suggestions rendered in UI can also include and/or may be associated with one or more "engineered template prompts" that are configured to add context to a given user input. The context may be an instruction describing how particular output of the LLM/engine should be formatted, how a particular data item can be retrieved by the engine, or the like. As one example, an engineered template prompt may be "${user prompt}. Provide output of any table in the form of a tab delimited table formatted according to the markdown specification." In this example, the variable ${user prompt} may be replaced with the user prompt such that the entire prompt received by the generative output service 116 can include the user prompt and the example sentence describing how a table should be formatted.

In yet other embodiments, a suggestion may be generated by the generative output service 116. For example, in some embodiments, a system as described herein can be configured to assist a user in overcoming a cold start/blank page problem when interacting with a new document, new issue, or new board for the first time. For example, an example backend system may be Kanban board system for organizing work associated with particular milestones of a particular project. In these examples, a user needing to create a new board from scratch (e.g., for a new project) may be unsure how to begin, causing delay, confusion, and frustration.

In these examples, a system as described herein can be configured to automatically suggest one or more prompts configured to obtain output from an LLM that programmatically creates a template board with a set of template cards. Specifically, the prompt may be a preconfigured prompt as described above such as "generate a JSON document representation of a Kanban board with a set of cards each representing a different suggested task in a project for creating a new iced cream flavor." In response to this prompt, the generative output service 116 may generate a set of JSON objects that, when received by the Kanban platform, are rendered as a set of cards in a Kanban board, each card including a different title and description corresponding to different tasks that may be associated with steps for creating a new ice cream flavor. In this manner, the user can quickly be presented with an example set of initial tasks for a new project.

In yet other examples, suggestions can be configured to select or modify prompts that cause the generative output service 116 to interact with multiple systems. For example, a suggestion in a documentation system may be to create a new document content section that summarizes a history of agent interactions in an ITSM system. In some cases, the generative output service 116 can be called more than once (and/or it may be configured to generate its own follow-up prompts or prompt templates which can be populated with appropriate information and re-submitted to the generative output service 116 to obtain further generative output. More simply, in some embodiments, generative output may be recursive, iterative, or otherwise multi-step in some embodiments.

These foregoing embodiments depicted in FIG. 1 and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

For example, it may be appreciated that all software instances described above are supported by and instantiated over physical hardware and/or allocations of processing/memory capacity of physical processing and memory hardware. For example, the first platform backend 108 may be instantiated by cooperation of a processor and memory collectively represented in the figure as the resource allocations 108a.

Similarly, the second platform backend 110 may be instantiated over the resource allocations 110a (including processors, memory, storage, network communications systems, and so on). Likewise, the centralized summary generation service 112 is supported by a processor and memory and network connection (and/or database connections) collectively represented for simplicity as the resource allocations 112a.

The prompt management service 114 can be supported by its own resources including processors, memory, network connections, displays (optionally), and the like represented in the figure as the resource allocations 114a.

In many cases, the generative output service 116 may be an external system, instantiated over external and/or third-party hardware which may include processors, network connections, memory, databases, and the like. In some embodiments, the generative output service 116 may be instantiated over physical hardware associated with the host servers 102. Regardless of the physical location at which (and/or the physical hardware over which) the generative output service 116 is instantiated, the underlying physical hardware including processors, memory, storage, network connections, and the like are represented in the figure as the resource allocations 116a.

Further, although many examples are provided above, it may be appreciated that in many embodiments, user permissions and authentication operations are performed at each communication between different systems described above. Phrased in another manner, each request/response transmitted as described above or elsewhere herein may be accompanied by user authentication tokens, user session tokens, API tokens, or other authentication or authorization credentials.

Generally, generative output systems, as described herein, should not be usable to obtain information from an organizations datasets that a user is otherwise not permitted to obtain. For example, a prompt of "generate a table of social security numbers of all employees" should not be executable. In many cases, underlying training data may be siloed based on user roles or authentication profiles. In other cases, underlying training data can be preconditioned/scrubbed/tagged for particularly sensitive datatypes, such as personally identifying information. As a result of tagging, prompts may be engineered to prevent any tagged data from being returned in response to any request. More particularly, in some configurations, all prompts output from the prompt management service 114 may include a phrase directing an LLM to never return particular data, or to only return data from particular sources, and the like.

In some embodiments, the system 100 can include a prompt context analysis instance configured to determine whether a user issuing a request has permission to access the resources required to service that request. For example, a prompt from a user may be "Generate a text summary in Document123 of all changes to Kanban board 456 that do not have a corresponding issue tagged in the issue tracking system." In respect of this example, the prompt context analysis instance may determine whether the requesting user has permission to access Document123, whether the requesting user has written permission to modify Document123, whether the requesting user has read access to Kanban board 456, and whether the requesting user has read access to referenced issue tracking system. In some embodiments, the request may be modified to accommodate a user's limited permissions. In other cases, the request may be rejected outright before providing any input to the generative output service 116.

Furthermore, the system can include a prompt context analysis instance or other service that monitors user input and/or generative output for compliance with a set of policies or content guidelines associated with the tenant or organization. For instance, the service may monitor the content of a user input and block potential ethical violations including hate speech, derogatory language, or other content that may violate a set of policies or content guidelines. The service may also monitor output of the generative engine to ensure the generative content or response is also in compliance with policies or guidelines. To perform these monitoring activities, the system may perform natural language processing on the monitored content in order to detect key words or phrases that indicate potential content violations. A trained model may also be used that has been trained using content known to be in violation of the content guidelines or policies.

Further to these foregoing embodiments, it may be appreciated that a user can provide input to a frontend of a system in a number of suitable ways, including by providing input as described above to a frame rendered with support of a centralized summary generation service.

As further described herein, the system 100 supports content summary generation within a content collaboration system. In one or more embodiments, as further described herein, the system 100 utilizes selectable graphical objects within a graphical user interface (GUI) that is displayed at a client device. The selectable graphical objects may contain a portion of content obtained from target content, and other selectable elements and graphics. A user may be provided, via the GUI, with an input to use to request a summary of the target content. The system, for example by the centralized summary generation service 112, may generate a prompt and provide to the generative output engine (e.g., via the generative output service 116) that prepares and outputs a generative response. The generative response may include a textual, natural language summary. The summary may be, for example, a textual summary of a page, set of messages, list of actions, key decisions, or items and summaries related to the target content. Subsequent processing of the summary may include identifying textual portions associated with system-specific items, and populating the summary with system-specific mentions, links, tables, video, audio, and so on. In some cases, the system-specific mentions are populated based on permissions that are specific to the user.

FIG. 2A depicts an example graphical user interface 200-a that supports content summary generation for collaboration platforms, in accordance with aspects described herein. Frontend interface 200-a may also be referred to as a UI or GUI. The frontend interface 200-a can be rendered by a client device 104 or a client device 106, which may be a personal electronic device such as a laptop, desktop computer, tablet and the like. The client device can include a display with an active display area in which a user interface, e.g., frontend interface 200-a can be rendered. The user interface can be rendered by operation of an instance of a frontend application associated with a backend application that collectively define a software platform as described herein. In some examples described herein, the graphical user interface 200-a may be displayed subsequent to or in response to an authentication of a user of the content collaboration platform.

The example graphical user interface 200-a includes a page having user-generated content 200-b displayed in a content panel 204 of the graphical user interface. Generally, the graphical user interface 200-a provided by the frontend or client application may operate in one of a number of different modes. In a first mode, a user may create, edit or modify page or other digital content. This mode or state of the graphical user interface may be referred to as an editor user interface, content-edit user interface, a page-edit user interface, or document-edit user interface. In a second or other mode, the user may view, search, comment on, or share the electronic document, page, or digital content. This mode or state of the graphical user interface may be referred to as an viewer user interface, content-view user interface, a page-view user interface, or document-view user interface. The graphical user interface may be implemented in a web browser client application using HTML, JavaScript, or other web-enabled protocol.

The graphical user interface 200-a may allow the user to create, edit, or otherwise modify user-generated content that is stored as an electronic page. The electronic page or other digital content may be rendered on a client device by the content collaboration service upon authorization/authentication of the user by the authentication/authorization service, and based on permissions granted to the user as validated according to a user profile associated with the user. Further, the content that is rendered in the content panel, including the selectable graphical objects 206, which may contain content extracted from or obtained from other content items having their own respective permissions profiles.

In one example, the graphical user interface 200-a may have various panels, partitions, sections, or panels displaying different content. For example, the graphical user interface 200-a includes a navigational panel 208, a toolbar 205, and a content panel 204. The navigational panel 208 displays a hierarchical element tree 210 also referred to herein as a page tree. The hierarchical element tree 210 includes a hierarchically arranged set of elements, each element selectable to cause display of a respective content item in the content panel 204. The elements may include a short title and/or graphical elements that indicate the subject matter and type of content item associated with each respective element. Many of the elements may also be selected and moved within the hierarchical element tree 210 in order to redefine a parent-child relationship between the respective elements. The collection of elements depicted in the navigational panel 208 may be associated with a respective space, also referred to herein as a content space, page space, or document space. As discussed previously, a space defines a collection of content items for which the space creator is the default administrator having default read, write, view, and control permissions with respect to all items within the space.

Generally, the graphical user interface 200-*a* is used to generated and display user-generated content 206. As shown in FIG. 2A, the user-generated content includes text content 212, which may be formatted in accordance with a formatting scheme, such as HTML, XML, Atlassian Document Format (ADF), or other similar scheme or language. In some examples, the text content can also be displayed in line with hypertext, graphical elements and other content that is enabled by the editor instantiated by the frontend application within the content panel 204.

The user-generated content also includes other elements that may be generated by respective sets of macro instructions that are associated with the page. Example macro-enabled content include the selectable graphical objects 206, which include embedded content extracted from respective target content items that are linked to the objects. For example, the selectable graphical objects 206 may include an extracted title, brief description embedded graphics, and other content extracted from the respective content item. The selectable graphical objects 206 may also include selectable elements or virtual buttons that allow the user to modify the target content item directly from the selectable graphical objects 206. The selectable graphical objects 206 may also include graphics indicating the type of content that is linked and the respective platform that is hosting the content. Examples of selectable graphical objects 206 are illustrated.

A first selectable graphical object 214 and a fourth selectable graphical object 220 are examples of a selectable graphical objects that share a common graphic indicating that the selectable graphical object is associated with a first type of platform, such as a documentation platform. The graphical user interface 200-*a* is shown as an example of a documentation platform consistent with the disclosure here, and the navigational panel 208, the toolbar 205, and the content panel 204 are of such documentation platform. In some embodiments, the documentation platform is a part of the content collaboration system as the documentation platform associated with the first selectable graphical object 214 and the fourth selectable graphical object 220. However, in other embodiments, the selectable graphical objects can be a documentation platform different from the documentation platform shown for the graphical user interface 200-*a*, for example a different type of documents platform within the same content collaboration system. In still other embodiments, the selectable graphical objects can be a documentation platform different from the documentation platform shown for the graphical user interface 200-*a*, and the documentation platform may also be external to the content collaboration system, for example operated by a third party.

A second selectable graphical object 216 and a third selectable graphical object 218 are examples of selectable graphical objects that share another common graphic indicating that the selectable graphical object is associated with a second type of platform, such as a communication platform, which may a part of or external to the content collaboration system.

A fifth selectable graphical object 222 is an example of a selectable graphical object that may be associated with a third type of platform, such as an issue tracking platform. A sixth selectable graphical object 224 is an example of a selectable graphical object that may be associated with a fourth type of platform, such as a file hosting and sharing platform. A seventh selectable graphical object 226 is an example of a selectable graphical object that may be associated with a fifth type of platform, such as a third-party content collaboration platform that includes a multiplicity of different types of platforms or sub-platforms, such as document creation and collaboration and file hosting and sharing.

In some embodiments, other macro-enabled content may be in the content panel 204, includes graphical items which includes graphics (e.g., diagrams, charts, or other graphics) that are extracted from another content item. In some cases, the graphical items are extracted from content items provided by a separate platform and are updated in response to a page refresh or load operation. Other macro-enabled content may include in-line comments, embedded viewports such as iframe elements, tables generated using linked content, and other similar items. As described herein, the system may reconcile an authenticated user's permissions with permissions profiles for each of the embedded or macro-enabled content of the page before rendering the respective items. This prevents disclosure of potentially sensitive content to users that do not have the appropriate access or permissions.

In some embodiments, a user may control public access to a page by accessing a control panel (also referred to as a floating window element) by selecting a corresponding control of the toolbar 205 and configuring the page to allow for secure (limited) access, or public access. In some cases, the public access version may be a reduced or restricted version of the secure version. For example, the public access version may omit certain sensitive information, such as internal IDs or addresses, so that such information is not shared external to the content collaboration system.

In some embodiments, before a control element may be enabled or before the page may be made publicly available, the system may need to resolve a hierarchical permission scheme in which multiple levels of control must allow for public sharing of content for the specific page, for the respective space, at a respective site or platform level, and for a particular tenant or cross-platform level. In some implementations, in accordance with one or more of the levels prohibiting or restricting public access, one or more of the controls the controls may be grayed out or inoperable. In some implementations, operation of the control 442 not permitted by one or more levels of the control scheme may cause display of an informational window with a brief description indicating which level of control is prohibiting public sharing of the page and a brief explanation of why content may not be shared publicly.

In one or more embodiments, the graphical user interface 200-*a* is an example of a graphical user interface that is caused to be generated in the content collaboration system. In some examples, the graphical user interface 200-*a* may be displayed subsequent to or in response to an authentication of a user of the content collaboration platform.

Figure 2B:
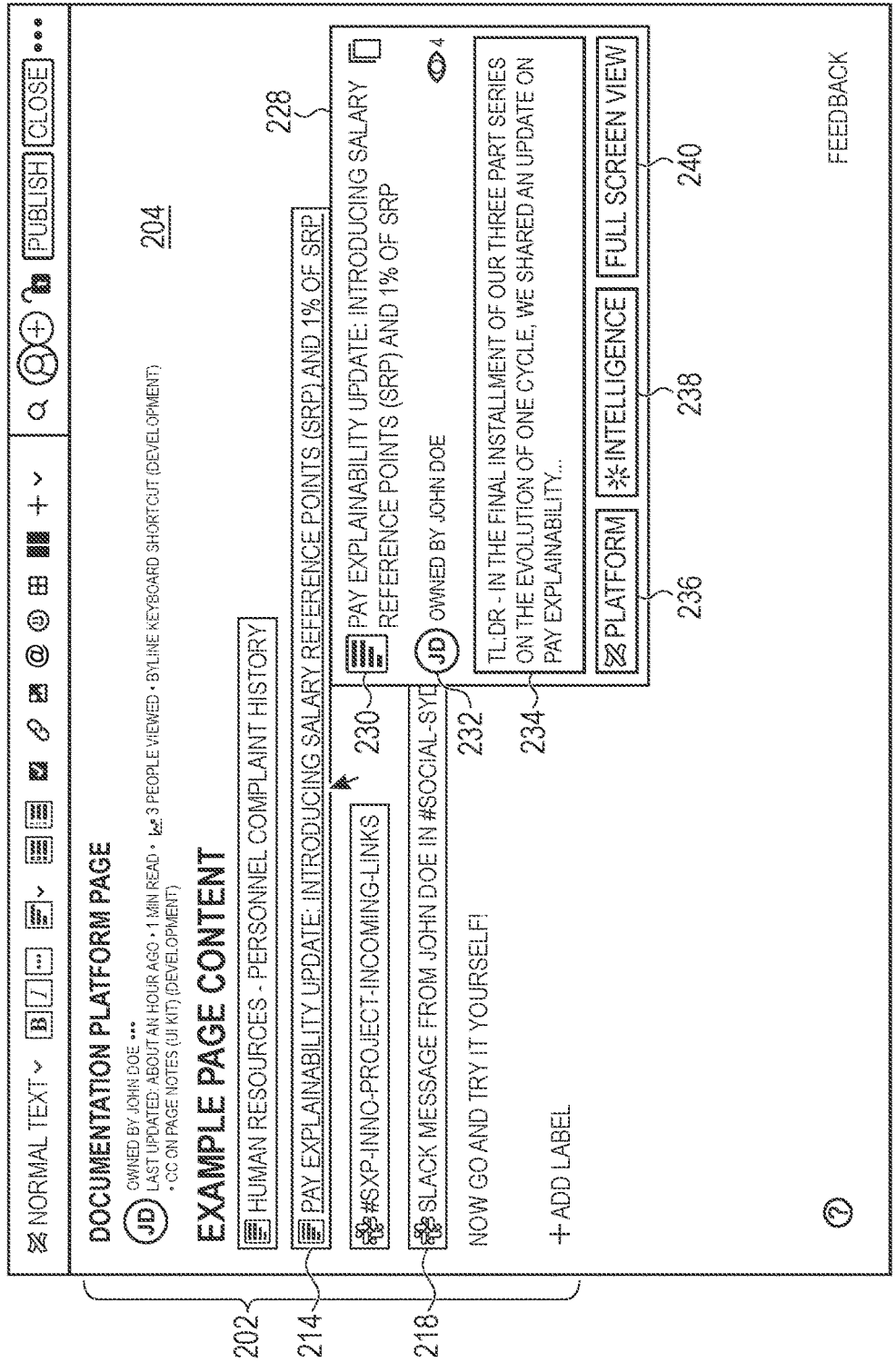
FIG. 2B depicts an example frontend interface that supports content generation in content collaboration platforms, in accordance with aspects described herein.

FIG. 2B depicts an example of a graphical user interface 200-*b* that supports content summary generation for collaboration platforms, in accordance with aspects described herein. A user selects one of the selectable graphical objects 206, for example using a user input device (e.g., mouse, stylus, trackpad, etc.). In the example of graphical user interface 200-*a*, the user selects the selectable graphical object 214, resulting in the graphical user interface 200-*b*.

In response to receiving the user input selecting the selectable graphical object 214, the system 100 (e.g., centralized summary generation service 112) provides a request for content to the database 118 of the system 100, the request for content associated with the selectable graphical object 214. The request for content may be formatted as a data-based call.

In the case that the selectable graphical object 214 is for a platform external to the system 100, such for the selectable graphical object 218 when the selectable graphical object 218 is for a third-party messaging platform, the request for content may be a call to a different database, for example via an API call requesting the content from a third party platform.

The database 118 (or an external system) then provides at least a portion of the content. The content may include textual content, images, graphics, videos, charts, data, structured data, links to other content of the system 100, links to targets external to the system 100, metadata regarding the content, or any other suitable content stored within the database 118 of the system. In some examples, the metadata includes one or more of an author, owner, group, or team associated with content, a creation, modification, due, or expiration date, a viewing or editing history, or the like.

At least a portion of the content and metadata can then be displayed within the graphical user interface 200-b. In one or more embodiments, a window 228 is generated in the graphical user interface 200-b. The window 228 may be also referred to as a hover or hover card, popup, callout, or other term indicating a sub-display within the graphical user interface 200-b. In one or more embodiments, window 228 may be moveable (e.g., draggable), or otherwise able to be repositioned by a user within the graphical user interface 200-b.

In the example of window 228 generated for the selectable graphical object 214, a heading 230 (e.g., a title or other text of the selectable graphical object 214) is displayed as well as metadata 232 associated with the content (the target content), which is illustrated as an owner and a number of views of the content. A content portion is also displayed in a content frame 234. Where the content is short (e.g., for text) or small (e.g., for a graphic, image, or table), the full content may be displayed within content frame 234. However, in some cases, the retrieved content exceeds a size of the content frame, such that a portion of the content is displayed, for example a first portion of the content (e.g., for text), or a top portion or reduced size or resolution version of the content (e.g., for a graphic, image, or table).

In addition, window 228 includes a platform indication 236, a user input 238 for a generative output engine, and a full screen button 240. The full screen button 240 allows a user to switch from window 228 to view aspects of the target content associated with the selectable graphical object 214, to the target content itself. In the case that the user selects the full screen button 240, the page having user-generated content 202 may be replaced with a new page having user-generated content in graphical user interface 200-b, where the user-generated content is the target content of selectable graphical object 214. As further discussed herein, the user input 238 accepts user input for the generative output engine.

In one or more examples, the user input 238 of window 228 is a virtual button that when selected is an indication that the user requests a particular operation of the generative output engine, such as creating and providing a summary of the target content associated with the selectable graphical object 214. In other examples, the user input 238 of window 228 accepts user input in text form, including natural language text. For example, a user may indicate, via a text request, that the generative output engine create and provide a summary of the target content associated with the selectable graphical object 214.

In the example of graphical user interface 200-b, the user has previously selected the first selectable graphical object 214, though the selection of other of selectable graphical objects 206 may result in a similar set of actions and display within a window 228 at the graphical user inter interface 200-b. In some examples, the content frame 234 may be tailored according to the platform associated with the selectable graphical object 214. For example, a text preview may be displayed in the content frame 234 for a document platform. In another example, a first message of a message string may be displayed in the content frame 234 for a messaging platform. In another example, a set of image and/or video preview thumbnails may be displayed in the content frame 234 for a media sharing platform.

A user input is provided to the user input 238, providing an indication of a request by a user for a summary of the content, a portion of the content being displayed in the content frame 234. In response to receiving the user input requesting a summary of the content, the centralized summary generation service 112 may generate a summary-generation prompt for the generative output engine. In particular, the summary-prompt includes at least a portion of the content. The summary-generation prompt may further include one or more exemplary content-summary pairs, for example to demonstrate for the generative output engine example input content and correct example output summaries associated with each input content. In some cases, the content-summary pairs are selected by the centralized summary generation service 112 according to a type of the content, for example depending on the platform that the content is associated with. For selectable graphical object 214, which is associated with target content of a documentation platform the content-summary pairs may be bodies of source text paired with exemplary textual summaries of that source text.

The summary-generation prompt that is generated by the centralized summary generation service 112 is then provided to the generative output engine using an application program interface call, for example via prompt management service 114 and generative output service(s) 116 according to the techniques described further herein. Following processing by the natural language engine, the system 100 (e.g., at centralized summary generation service 112) obtains a generative response from the generative output engine. Based on at least a portion of the generative response, the system 100 then causes the generation of a natural language summary string within the window 228.

Figure 2C:
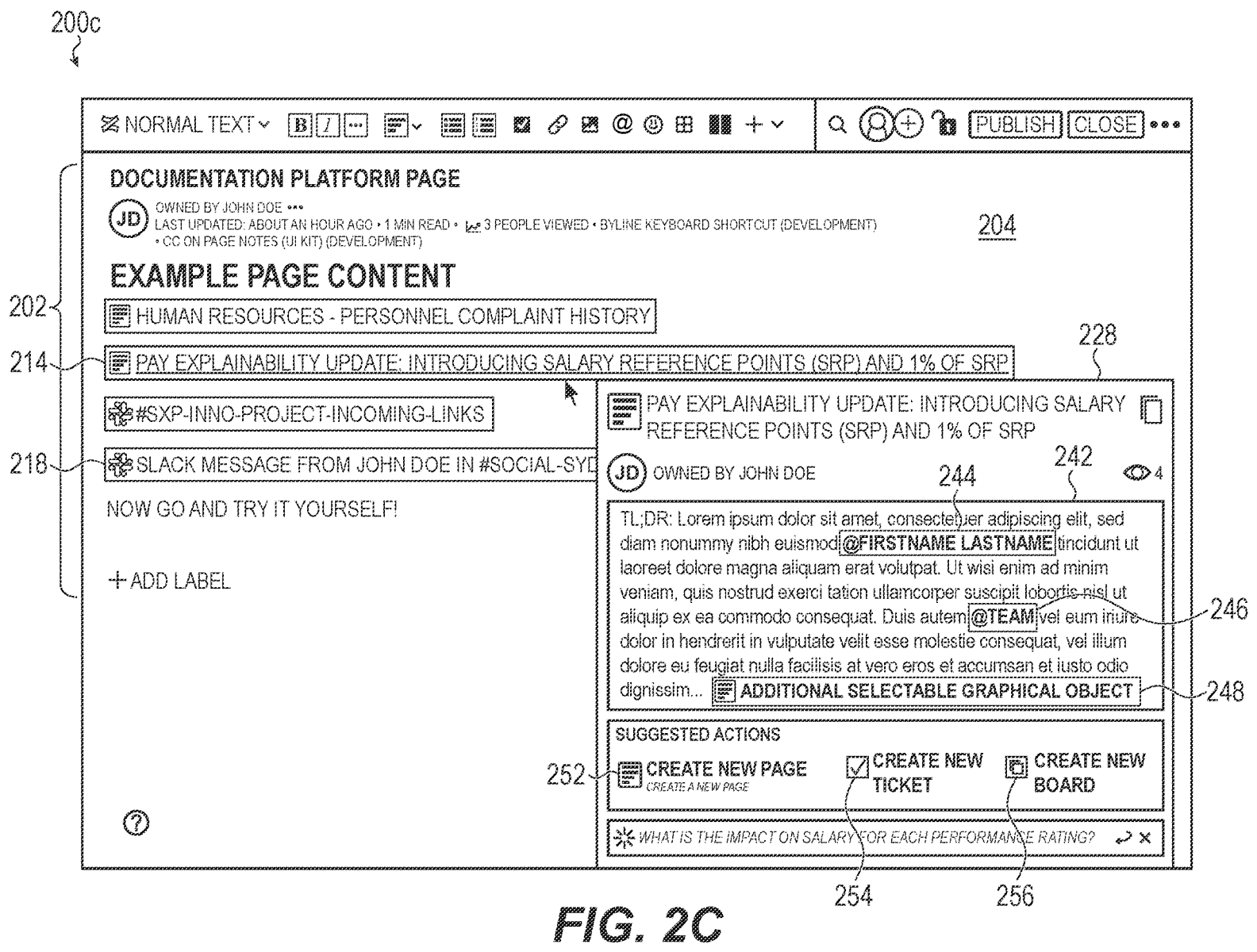

FIG. 2C depicts an example of the graphical user interface 200-c that supports content summary generation for collaboration platforms, in accordance with aspects described herein. The graphical user interface 200-c illustrates the window 228 of graphical user interface 200-b after the generation of a natural language summary string within the window 228.

In the window 228 of graphical user interface 200-b, the text or other content of the content frame 234 is replaced with a natural language summary string 242. In one or more examples, the natural language summary string 242 is at least a portion of the output of the generative response. In some examples, post-processing of the returned generative response and/or natural language summary string 242 may be performed to replace (e.g., populate, insert, hydrate, etc.) text of the natural language summary string 242 with a reference of the system 100. In some cases the reference of the system 100 may be specific to the system 100, or a particular platform of the system 100. A non-exhaustive list of example references of the content collaboration system include a person name, a team name, a page, a ticket, a board, a card, or a selectable graphical object.

In one example, the centralized summary generation service 112 may analyze the natural language summary string 242 to identify names of users of the system 100, and replace a simple text name with a personal mention 244 (e.g., "@FirstnameLastname") or team mention 246 ("@Team"). A mention (also known as "@mentions") may be used to draw a user's or team's attention to a page, comment, task, or other content. A set of one or more persons may be associated with a team mention 246. For example, the creation of a personal mention 244 or team mention 246 can be used as a trigger for a notification to the person(s) associated with the personal mention 244 or team mention 246.

In another example, the centralized summary generation service 112 may analyze the natural language summary string 242 to identify content elsewhere in the system 100, for example a page, issue, message, board, and so on, that are referred to in the natural language summary string 242. The centralized summary generation service 112 can then replace text of the natural language summary string 242 with an additional selectable graphical object 248, or insert the additional selectable graphical object 248 into the natural language summary string 242.

In additional examples, further context is obtained as a result of the analysis of the content, or based on the metadata associated with the content. The context may be generated in window 228 with the natural language summary string 242. In one or more examples, the context includes one or more of additional messages of a messaging platform, a transcript from a video conferencing platform, referenced and/or linked content, or content in a page tree, and so on. In some examples, the context is identified using a link-content graph. For system 100, a link content graph is a representation of the link profile between pages, issues, cards, tasks, and so on, on platforms of the system 100. The link-content graph includes the different connections, including the direction of the connection, and may be used to map out the structure of the system 100 and/or the various platforms. From the content, the link-content graph can used to determine context to generate in window 228. For example, window 228 may display a selectable graphical object for each content that is connected to the selectable graphical object 214 via a single reference or link in the link-content graph. In other examples, the target content of the selectable graphical object is directly in the window 228.

In some examples, one or more suggested actions 250 are generated in the graphical user interface 200-c. The one or more suggested actions 250 generally take at least a part of the natural language summary string and perform an action in the same platform or a different platform (e.g., a platform within the system 100, or a third-party platform external to the system 100). Additionally, or alternatively, the one or more suggested actions 250 take one or more pieces of metadata associated with the generated natural language summary string as an input to the one or more suggested actions 250. Additionally, or alternatively, the one or more suggested actions 250 take one or more of the information specific to the system 100 that was inserted into the generated natural language summary string as an input to the one or more suggested actions 250. For example, one or more of the personal mention 244, the team mention 246, or the additional selectable graphical object 248 may be used as an input to the one or more suggested actions 250.

Examples of suggested actions include a first suggested action 252 to create a new page, for example in a documentation platform of the system 100. Another example suggested action is a second suggested action 254 to create a new ticket, for example in a issue tracking platform of the system 100. Another example suggested action is a third suggested action 256 to create a new board, for example in a project management platform of the system 100.

In some cases, the suggested actions may be generated in the graphical user interface 200-c dependent upon the platform associated with the selectable graphical object 214. For example the selectable graphical object 214 may be a page of a documentation platform, and the set of suggest actions are the first suggested action 252, second suggested action 254, and third suggested action 256. In other examples, the selectable graphical object may be a ticket of an issue tracking platform, and the set of suggest actions are the first suggested action 252, the third suggested action 256, a suggest action to create and populate a message of a third-party messaging platform.

The window 228 of graphical user interface 200-b may further have an input field 258 that may be used to receive a natural language query string. Based on the natural language query string, the centralized summary generation service 112 generates a query prompt that is provided to the generative output engine using an API call. In some examples, the query prompt includes the natural language query string and at least a portion of the natural language summary string. The centralized summary generation service 112 obtains a generative response from the generative output engine in response. The system 100 (e.g., the centralized summary generation service 112) then causes a response (which may be or be referred to as a natural language query response string) that is based on at least a portion of the obtained generative response to be displayed for a user.

Figure 2D:
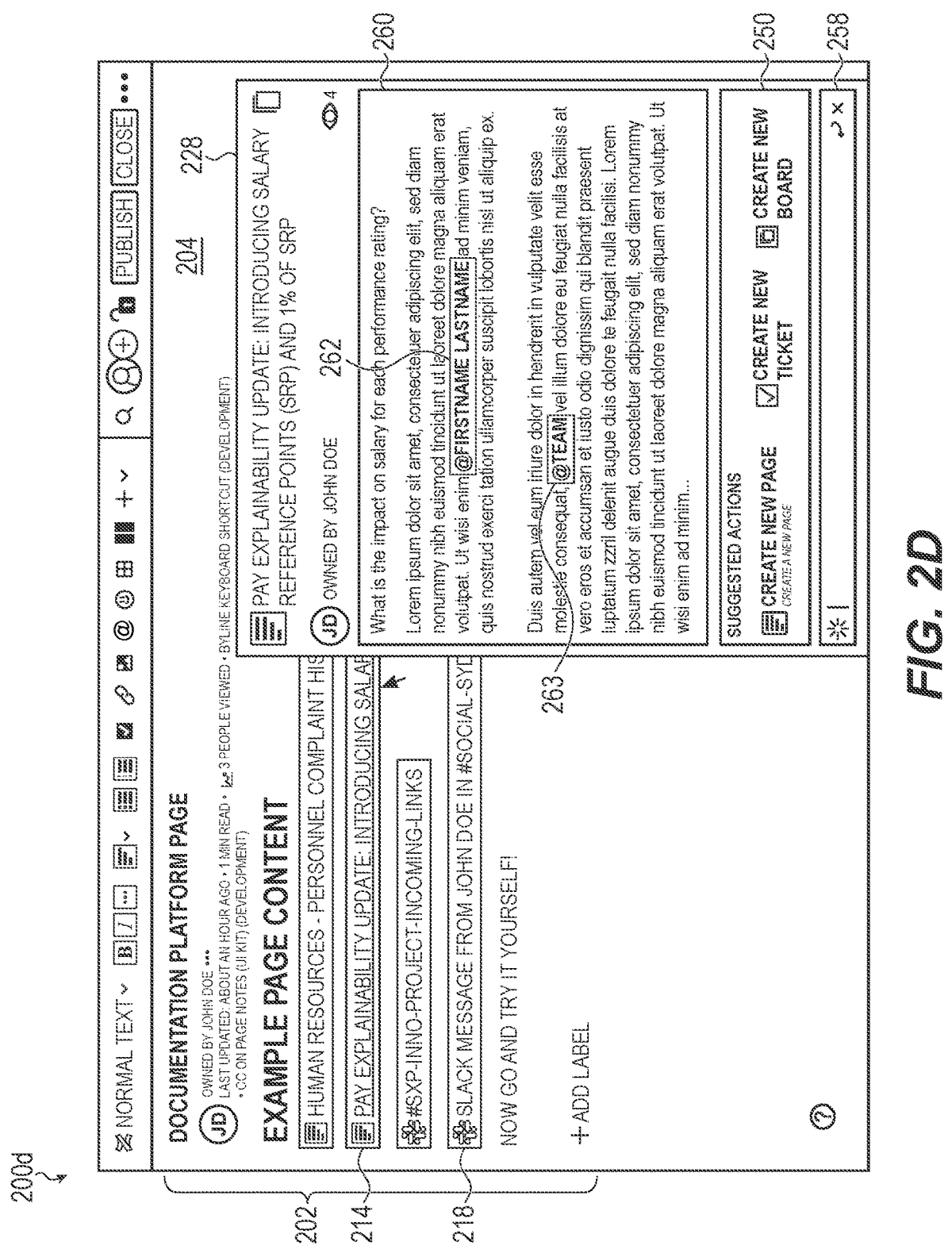

FIG. 2D depicts an example of the graphical user interface 200-d that supports content summary generation for collaboration platforms, in accordance with aspects described herein. The graphical user interface 200-c illustrates the window 228 of graphical user interface 200-b after the generation of a natural language summary string within the window 228. The natural language query response string 260 is responsive to a natural language query string provided to the system 100 via input field 258. Similarly as for the natural language summary string 242 discussed herein, post-processing of the returned generative response and/or natural language query response string 260 may be performed to replace (e.g., populate, insert, hydrate, etc.) text of the natural language summary string 242 with one or more references of the system 100. Here, as an example, such references include a personal mention 262 and team mention 263, though other types of references may be inserted, including for different platforms.

In some cases, user input 238 of graphical user interface 200-b may be used to receive a natural language query string, for example prior to the generation of the summary (e.g., natural language summary string 242).

FIG. 2E depicts an example of the graphical user interface 200-e that supports content summary generation for collaboration platforms, in accordance with aspects described herein. The graphical user interface 200-e illustrates a result of a user selecting one of the suggested actions 250 illustrated with reference to the graphical user interface 200-c, in particular the first suggested action 252. Graphical user interface 200-e includes a new content window 264 generated in a documentation platform of the system 100. The documentation platform (e.g., centralized summary generation service 112), responsive to the user selecting the first suggested action 252 has prepared a new, draft page of the documentation platform, and populated a body of the new content window 264 with the natural language summary string generated using the generative output engine. In some cases, where applicable, the one or more references of the natural language summary string 242 (e.g., the post-processed version of the natural language summary string 242) are also included in the draft page. For examples, the body of the new content window 264 may include one or more of the personal mention 244, team mention 246, or additional selectable graphical object 248.

In some examples, metadata associated with the creation are also generated for the draft page, for example a creation date, a user, or an indication of the source for the summary (e.g., the target content indicated by the selectable graphical object 214). The draft new content window 264 may be further modified by a user, then published, saved as a draft, discarded, or shared.

Although illustrated with reference to the creation of a new page as the action, for example by user selection of the first suggested action 252, the system 100 would similarly response for a different platform (or different suggested action of the same platform) for a different suggested action. Examples of different suggested actions include the second suggested action 254 and the third suggested action 256.

FIG. 3 depicts an example of a graphical user interface 300 that supports content summary generation for collaboration platforms, in accordance with aspects described herein. The graphical user interface 300 illustrates an example of a window 302, which may be also referred to as a hover or hover card, popup, callout, or other term indicating a sub-display within the graphical user interface 300. Window 302 includes a title 306, metadata 308, a content window 310, one or more suggest actins 316, and an input field 258 that may be used to receive a natural language query string or request for summary of content to a generative output engine.

The generation of the window 302 within user interface 300 is responsive to the selection of the selectable graphical object 304, and a user has selected for the target content previously displayed in the content window 310 to be summarized. For example, the user may have indicated via a user input (e.g., similar to user input 238 of graphical user interface 200-b) for the generative output engine to provide a summary of the target content associated with the selectable graphical object 304, resulting in the content displayed in content window 310. In this example, the content of content window 310 include a first reference 312 (e.g., a name reference) and a second refence 314 (e.g., as selectable graphical object) that have been inserted.

In the example of graphical user interface 300, the selectable graphical object 304 is associated with a different platform type than the selectable graphical object 214 discussed herein with reference to the window 228. As such, a schema for display of the summarized content (e.g., the natural language summary string, including with zero or more reference inserted or populated) within window 310 may be different than the schema for the window 228. For example, the summary-prompt generated by the centralized summary generation service 112 as a result of the user input indicating for a summary to be prepared, can include a different schema to provide to the generative output engine together with the content from the target content for the selectable graphical object 214.

FIG. 4 depicts an example of a set of selectable graphical objects 400 that supports content summary generation for collaboration platforms, in accordance with aspects described herein. Each of selectable graphical objects 400 (which may be referred to as being in a card view) are formatted, generated, and displayed different from the selectable graphical objects 206 (which may be referred to as being in an inline view). For example, a first selectable graphical object 402 may be associated with a documentation platform, a second selectable graphical object 404 may be associated with an issue tracking platform, a third selectable graphical object 406 may be associated with a file sharing platform, a fourth selectable graphical object 408 may be associated with a first type of third-party document management and content collaboration platform, and a fifth selectable graphical object 410 may be associated with a second type of third-party document management and collaboration platform. In some cases, the selectable graphical object may include a preview (e.g., thumbnail image), a portion of text content, metadata, or other information extracted or otherwise obtained from the target content for the associated selectable graphical object. For example, the target content for the third selectable graphical object 406 includes a presentation document, and a thumbnail image 414 extracted from the target presentation document is included in the third selectable graphical object 406.

Each of the selectable graphical objects 400 include an input field 412 that may be used to receive a natural language query string or request for summary of content to a generative output engine. Selecting the input field 412 of one of the selectable graphical objects 400 can result in the generation of a hover window similar to window 242 discussed with reference to graphical user interface 200-c, which includes a summary string generated as a result of a generative output of the generative output engine for target content from the associated selectable graphical object.

Selecting a selectable graphical object can result in a hover window similar to window 228 discussed with reference to graphical user interface 200-b, and the hover window may also include an input field 412 with aspects similar to those of input field 238 discussed with reference to graphical user interface 200-b.

Figure 5:
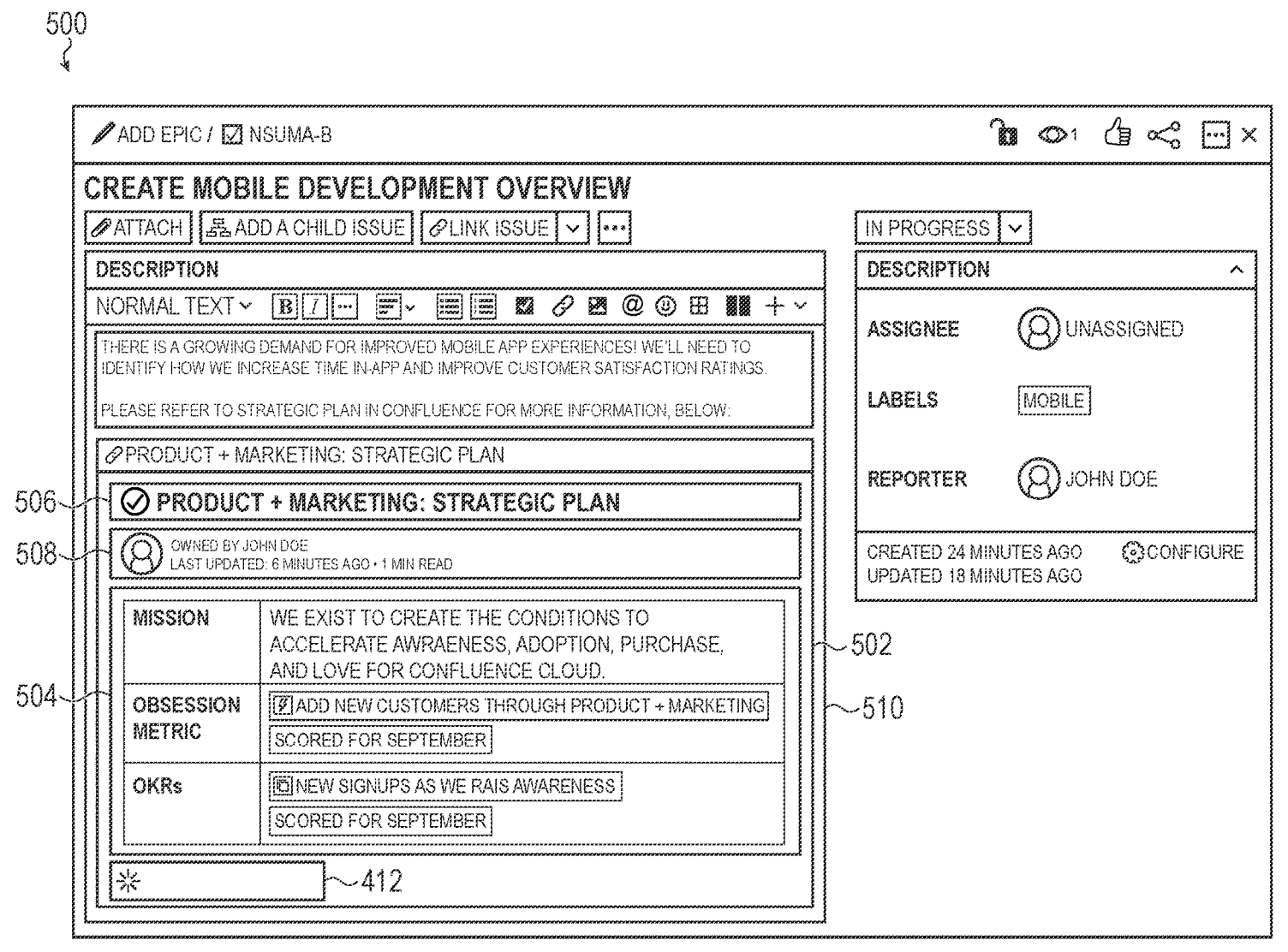

FIG. 5 depicts an example of a graphical user interface 500 that supports content summary generation for collaboration platforms, in accordance with aspects described herein. In particular, graphical user interface 500 illustrates a selectable graphical object 502 in an embedded view, within a page 510 of a documentation platform. In some examples, the embedded view allows for a full view of the target content 504, within the context of the page 510, including a title 506 and metadata 508 for the target content.

Also within the embedded view of the selectable graphical object 502 is an input field 412, described herein. As further described herein, selecting the input field 412 can generate a hover window similar to window 242 discussed with reference to graphical user interface 200-c. Additionally, or alternatively, selecting the input field 412 can generate a hover window similar to window 228, which itself includes an input field 412.

These foregoing embodiments depicted in FIGS. 2A-5 and the various alternatives thereof and variations thereto are presented, generally, for purposes of explanation, and to facilitate an understanding of various configurations and constructions of a system and related user interfaces and methods of interacting with those interfaces, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

For example, it may be appreciated that a common editor frame is only one method of providing input to, and receiving output from, a generative output engine as described herein.

Figure 6:
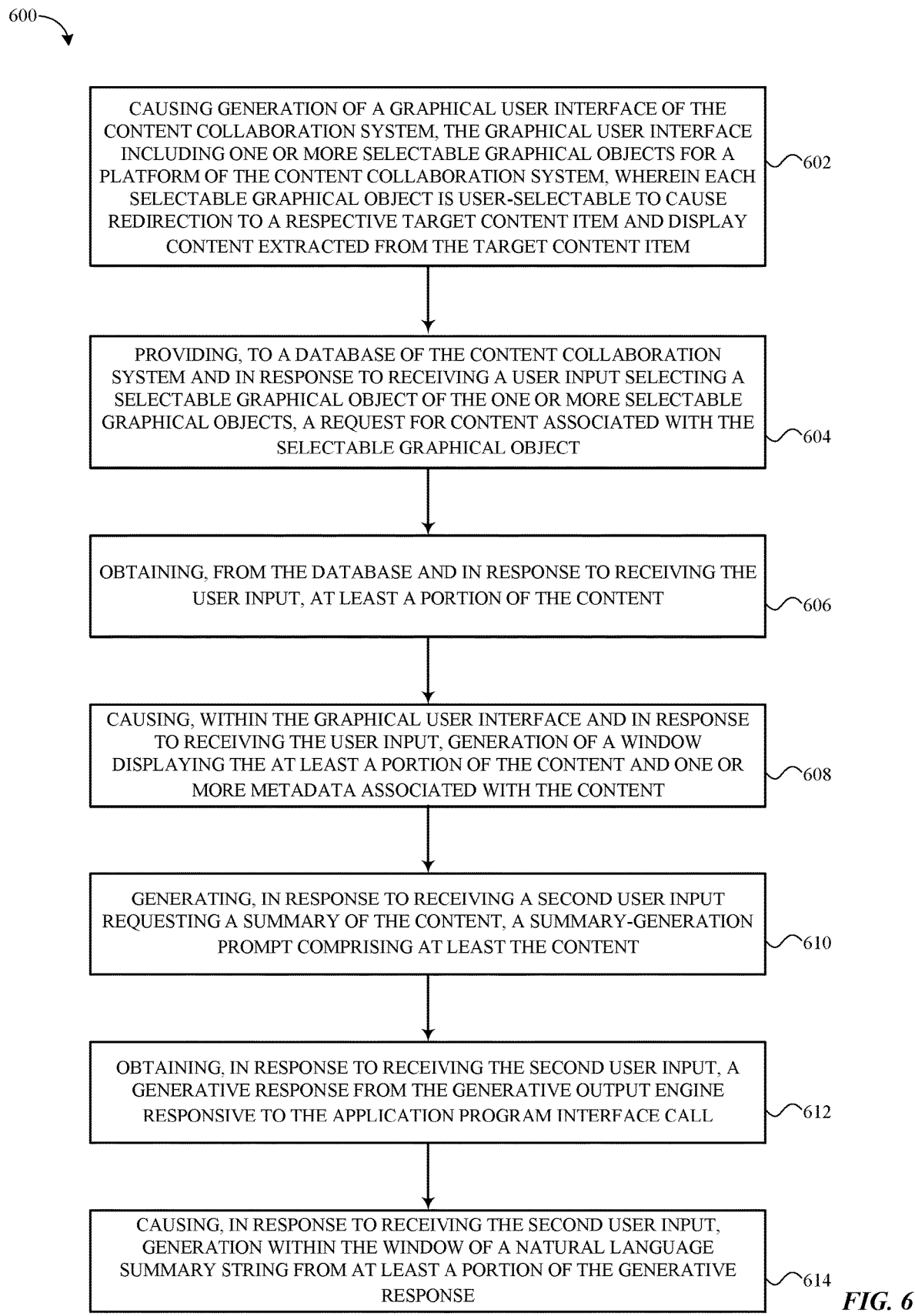
FIG. 6 depicts an example method of content summary generation within a content collaboration system, according to one or more aspects described herein.

FIG. 6 shows an example method 600 of content summary generation within a content collaboration system, according to one or more aspects described herein. In one or more embodiments, method 600 supports one or more aspects of content generation in content collaboration platforms, including summary generation within selectable graphical objects, as further described herein. The method 600 may be performed using a processor, or other components of the content collaboration system.

At 602, the method 600 includes causing generation of a graphical user interface of the content collaboration system, the graphical user interface including one or more selectable graphical objects for a platform of the content collaboration system, wherein each selectable graphical object is user-selectable to cause redirection to a respective target content item and display content extracted from the target content item.

At 604, the method 600 includes providing, to a database of the content collaboration system and in response to receiving a user input selecting a selectable graphical object of the one or more selectable graphical objects, a request for content associated with the selectable graphical object.

At 606, the method 600 includes obtaining, from the database and in response to receiving the user input, at least a portion of the content.

At 608, the method 600 includes causing, within the graphical user interface and in response to receiving the user input, generation of a window displaying the at least a portion of the content and one or more metadata associated with the content.

At 610 the method 600 includes generating, in response to receiving a second user input requesting a summary of the content, a summary-generation prompt comprising at least the content.

At 612 the method 600 includes obtaining, in response to receiving the second user input, a generative response from the generative output engine responsive to the application program interface call.

At 614 the method 600 includes causing, in response to receiving the second user input, generation within the window of a natural language summary string from at least a portion of the generative response.

In one or more embodiments, the method 600 further includes causing generation of an action object within the window, the action object selectable to initiate performance of an action to generate content incorporating the natural language summary string. In some embodiments, the platform is a first platform, and the action object is for the first platform or a second platform different from the first platform. In some embodiments, the method 600 further includes, in response to receiving a third user input selecting the action object, performing the action to generate and display the generated content of the content collaboration system that includes at least a portion of the natural language summary string. In some embodiments, the method 600 further includes, in response to receiving a fourth user input selecting a save action, storing the generated content that includes the at least a portion of the natural language summary string.

In one or more embodiments, the method 600 further includes, in response to receiving the third user input selecting the action object, determining one or more portions of the natural language summary string are mappable to one or more references of the content collaboration platform. In some embodiments, the method 600 further includes replacing each portion of the one or more portions of the natural language summary string with a respective reference of the one or more references, wherein the one or more references comprise one or more references to a person name, a team name, a page, a ticket, a board, or a card of the content collaboration system.

In some embodiments, the application program interface call is a first application program interface call, and the generative response is a first generative response. The method 600 may then further include, in response to receiving a natural language query string at an input field of the graphical user interface, generating a query prompt comprising at least the natural language query string and at least a portion of the natural language summary string. The method 600 may further include, in response to receiving the natural language query string, providing the query prompt to a generative output engine using a second application program interface call. The method 600 may further include, in response to receiving the natural language query string, obtaining a second generative response from the generative output engine responsive to the second application program interface call. The method 600 may further include, in response to receiving the natural language query string, causing generation, within the window, of a natural language query response string from at least a portion of the second generative response.

In one or more embodiments, the method 600 further includes, causing generation, within the window, of the natural language query string associated with the natural language query response string.

In some embodiments, the generative response includes an object identifier. In one or more embodiments, the method 600 further includes, in response to receiving the generative response from the generative output engine, identifying an object of the content collaboration system based at least in part on the object identifier of the generative response In some embodiments, the method 600 further includes, causing generation, within the window, of the natural language summary string and the identified object.

In some embodiments, the selectable graphical object of the one or more selectable graphical objects is a first selectable graphical object. In some embodiments, the window that includes the natural language summary string further includes a second selectable graphical object to content of the platform.

In one or more embodiments, the method 600 further includes, causing generation, within the window, of the second selectable graphical object to content of the platform based on at least a portion of the generative response. Additionally or alternatively, in some embodiments, the platform is a first platform of the content collaboration system, and the second selectable graphical object is to a second platform of the content collaboration system.

In one or more embodiments, the method 600 further includes, obtaining, from the database, one or more metadata associated with the content, and causing generation, within the window, of the natural language summary string and an indication of the one or more metadata associated with the content.

In one or more embodiments, the method 600 further includes, generating the summary-generation prompt comprising at least the content obtained from the database. In some embodiments, the summary-generation prompt is based at least in part on a permission of a user.

In some embodiments, the natural language summary string provides a summary of one or more of a page of a documentation platform, or an issue of an issue tracking platform, or a message thread of a communication platform. In some embodiments, the content comprises one or more of natural language text, an image, or a video.

The method 600 may be variously embodied, extended, or adapted, as described in the following paragraphs and elsewhere in this description.

Figure 7:
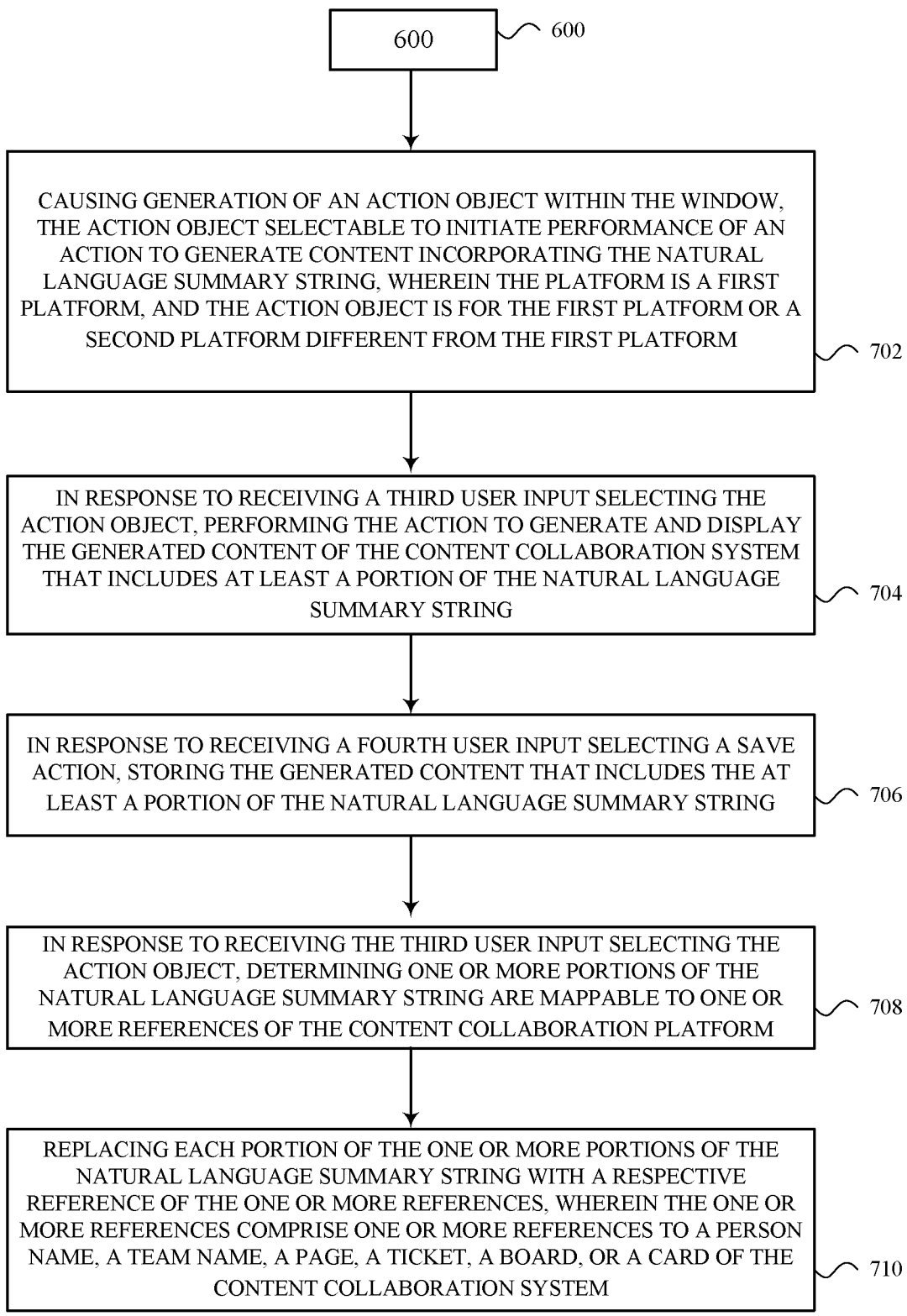
FIG. 7 depicts an example method of content summary generation within a content collaboration system, according to one or more aspects described herein.

FIG. 7 shows an example method 700 of content summary generation within a content collaboration system, according to one or more aspects described herein. In one or more embodiments, method 700 supports one or more aspects of content generation in content collaboration platforms, including summary generation within selectable graphical objects, as further described herein. The method 700 may be performed using a processor, or other components of the content collaboration system.

At 600, the method 700 includes performing operations previously discussed with reference to method 600.

At 702, the method 700 includes causing generation of an action object within the window, the action object selectable to initiate performance of an action to generate content incorporating the natural language summary string, wherein the platform is a first platform, and the action object is for the first platform or a second platform different from the first platform.

At 704, the method 700 includes, in response to receiving a third user input selecting the action object, performing the action to generate and display the generated content of the content collaboration system that includes at least a portion of the natural language summary string.

At 706, the method 700 includes, in response to receiving a fourth user input selecting a save action, storing the generated content that includes the at least a portion of the natural language summary string.

At 708, the method 700 includes, in response to receiving the third user input selecting the action object, determining one or more portions of the natural language summary string are mappable to one or more references of the content collaboration platform.

At 710 the method 700 includes replacing each portion of the one or more portions of the natural language summary string with a respective reference of the one or more references, wherein the one or more references comprise one or more references to a person name, a team name, a page, a ticket, a board, or a card of the content collaboration system.

In one or more embodiment, another method of content summary generation within a content collaboration system is described. In some embodiments, the method includes causing generation of a graphical user interface of the content collaboration system. The graphical user interface includes one or more selectable graphical objects for a platform of the content collaboration system, wherein each selectable graphical object is user-selectable to cause redirection to a respective target content item and display content extracted from the target content item.

The method further includes in response to receiving a first user input selecting a selectable graphical object of the one or more selectable graphical objects, providing, to a database of the content collaboration system, a request for content associated with the selectable graphical object. The method also includes obtaining at least a portion of the content from the database. The method further includes causing, within the graphical user interface, generation of a window displaying the at least a portion of the content and one or more metadata associated with the content.

The method further includes generating, in response to receiving a second user input requesting a summary of the content, a summary-generation prompt that includes at least the content. The summary-generation prompt may then be provided to a generative output engine using an application program interface call, and a generative response obtained from the generative output engine responsive to the application program interface call.

The method further includes causing generation of a natural language summary string within the window. In some embodiments, the natural language summary string is from at least a portion of the generative response. The method may further include causing generation of an action object within the window. In some embodiments, the action object is selectable to initiate performance of an action to generate content incorporating the natural language summary string.

The method further includes determining, in response to receiving a third user input selecting the action object, one or more portions of the natural language summary string are mappable to one or more references of the content collaboration platform. The method further includes determining, in response to receiving the third user input, one or more portions of the natural language summary string are mappable to one or more references of the content collaboration platform. The method further includes replacing, in response to receiving the third user input, each portion of the one or more portions of the natural language summary string with a respective reference of the one or more references. In some embodiments, the one or more references include one or more references to a person name, a team name, a page, a ticket, a board, or a card of the content collaboration system. The method further includes performing, in response to receiving a third user input, the action to generate and display the generated content of the content collaboration system that includes at least a portion of the natural language summary string.

The method further includes receiving, via the graphical user interface, a fourth user input selecting a save action. The method may further include, in response to receiving the fourth user input, storing the generated content and the one or more references. In some embodiments, the generated content is the content that includes at least a portion of the natural language summary string.

Figure 8A:
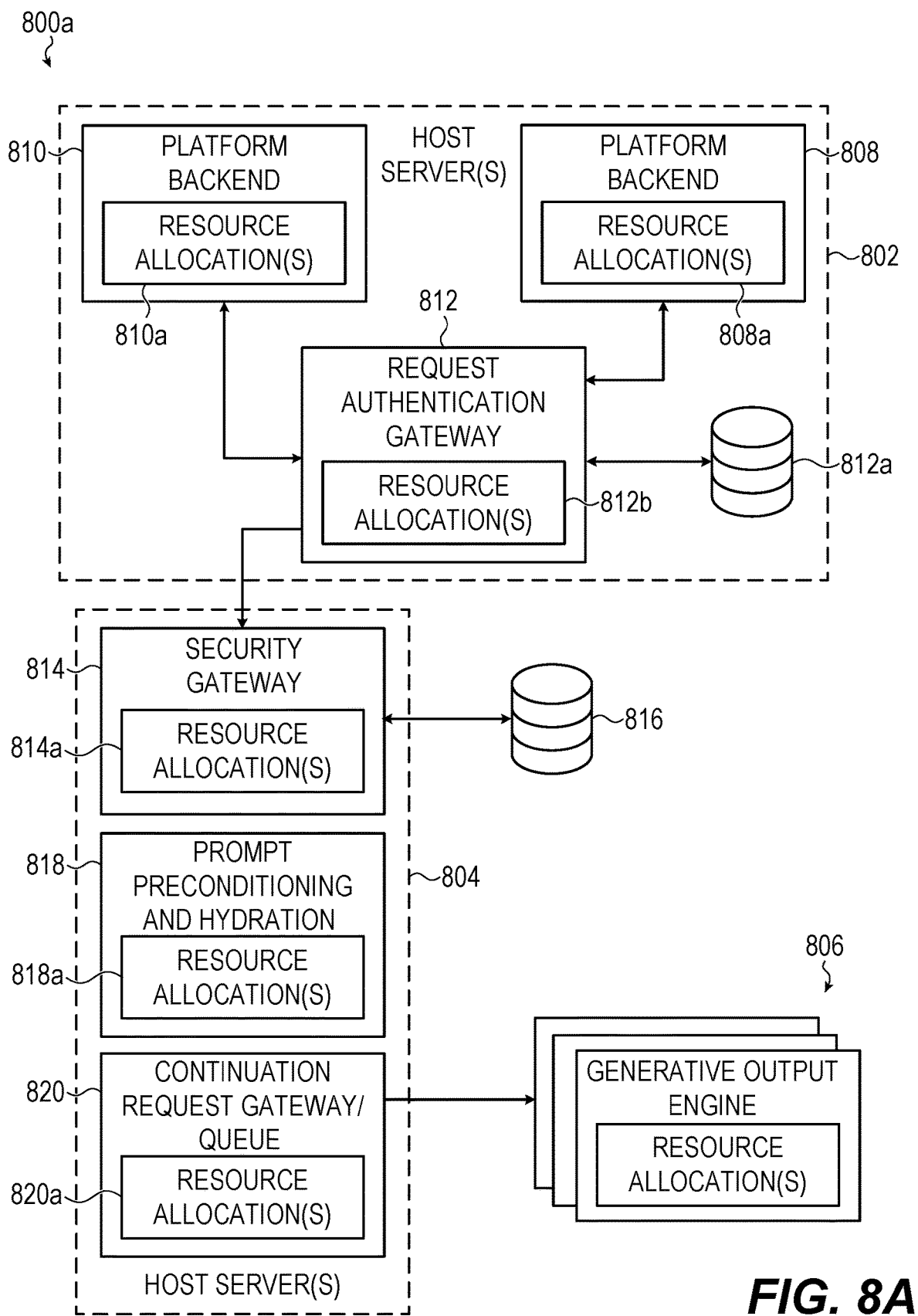
FIG. 8A depicts a simplified diagram of a system, such as described herein that can include and/or may receive input from a generative output engine.
Figure 8B:
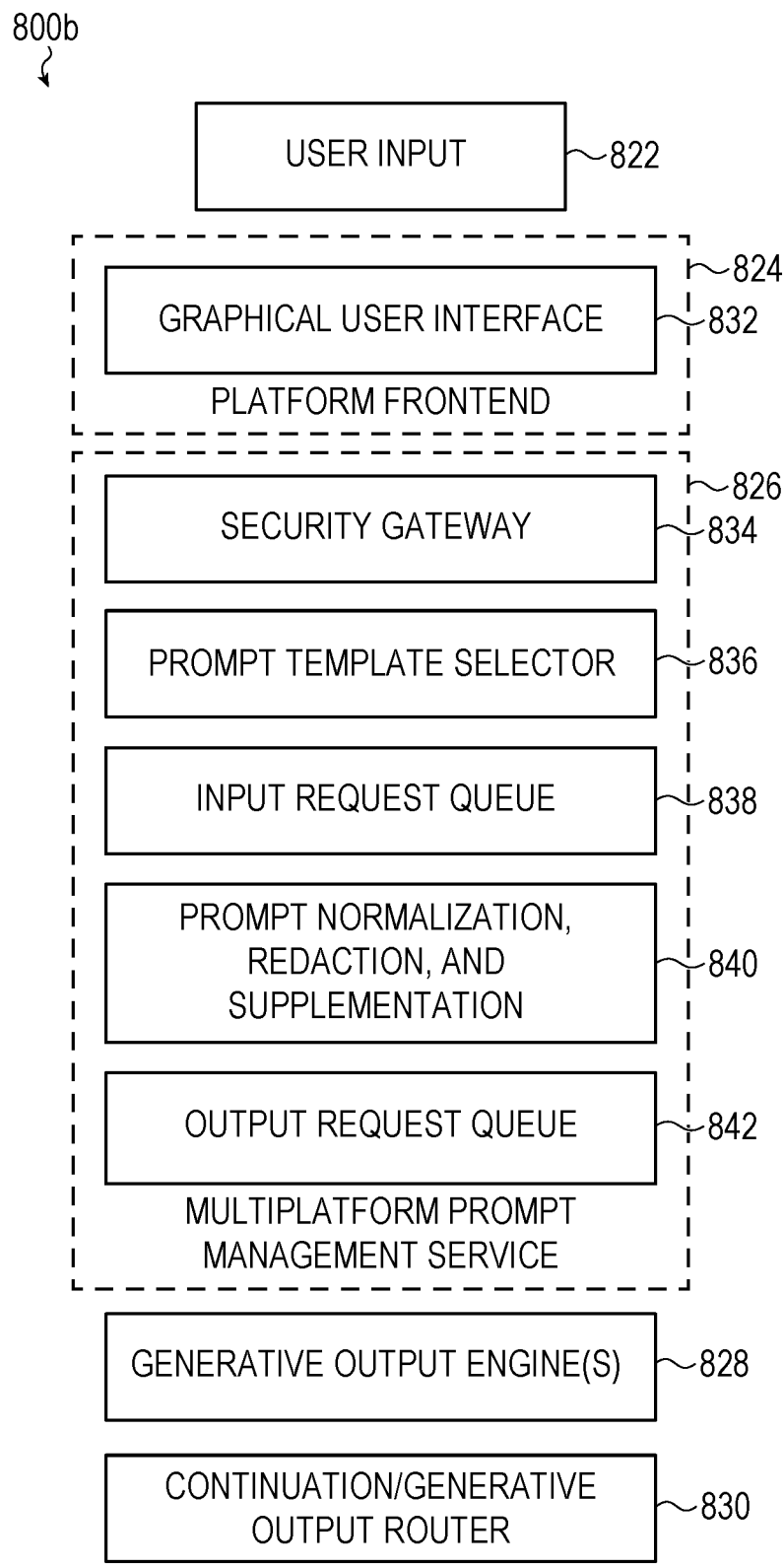
FIG. 8B depicts a functional system diagram of a system that can be used to implement a multiplatform prompt management service.

FIGS. 8A-8B depicts system diagrams and network/communication architectures that may support a system as described herein. Referring to FIG. 8A, the system 800*a* includes a first set of host servers 802 associated with one or more software platform backends. These software platform backends can be communicably coupled to a second set of host servers 804 purpose configured to process requests and responses to and from one or more generative output engines 806.

Specifically, the first set of host servers 802 (which, as described above can include processors, memory, storage, network communications, and any other suitable physical hardware cooperating to instantiate software) can allocate certain resources to instantiate a first and second platform backend, such as a first platform backend 808 and a second platform backend 810. Each of these respective backends can be instantiated by cooperation of processing and memory resources associated to each respective backend. As illustrated, such dedicated resources are identified as the resource allocations 808a and the resource allocations 810a.

Each of these platform backends can be communicably coupled to an authentication gateway 812 configured to verify, by querying a permissions table, directory service, or other authentication system (represented by the database 812a) whether a particular request for generative output from a particular user is authorized. Specifically, the second platform backend 810 may be a documentation platform used by a user operating a frontend thereof.

The user may not have access to information stored in an issue tracking system. In this example, if the user submits a request through the frontend of the documentation platform to the backend of the documentation platform that in any way references the issue tracking system, the authentication gateway 812 can deny the request for insufficient permissions. This example is merely one and is not intended to be limiting; many possible authorization and authentication operations can be performed by the authentication gateway 812. The authentication gateway 812 may be supported by physical hardware resources, such as a processor and memory, represented by the resource allocations 812b.

Once the authentication gateway 812 determines that a request from a user of either platform is authorized to access data or resources implicated in service that request, the request may be passed to a security gateway 814, which may be a software instance supported by physical hardware identified in FIG. 8A as the resource allocations 814a. The security gateway 814 may be configured to determine whether the request itself conforms to one or more policies or rules (data and/or executable representations of which may be stored in a database 816) established by the organization. For example, the organization may prohibit executing prompts for offensive content, value-incompatible content, personally identifying information, health information, trade secret information, unreleased product information, secret project information, and the like. In other cases, a request may be denied by the security gateway 814 if the prompt requests beyond a threshold quantity of data.

Once a particular user-initiated prompt has been sufficiently authorized and cleared against organization-specific generative output rules, the request/prompt can be passed to a preconditioning and hydration service 818 configured to populate request-contextualizing data (e.g., user ID, page ID, project ID, URLs, addresses, times, dates, date ranges, and so on), insert the user's request into a larger engineered template prompt and so on. Example operations of a preconditioning instance are described elsewhere herein; this description is not repeated. The preconditioning and hydration service 818 can be a software instance supported by physical hardware represented by the resource allocations 818a. In some implementations, the hydration service 818 may also be used to rehydrate personally identifiable information (PII) or other potentially sensitive data that has been extracted from a request or data exchange in the system.

One a prompt has been modified, replaced, or hydrated by the preconditioning and hydration service 818, it may be passed to an output gateway 820 (also referred to as a continuation gateway or an output queue). The output gateway 820 may be responsible for enqueuing and/or ordering different requests from different users or different software platforms based on priority, time order, or other metrics. The output gateway 820 can also serve to meter requests to the generative output engines 806.

FIG. 8B depicts a functional system diagram of the system 800a depicted in FIG. 8A. In particular, the system 800b is configured to operate as a multiplatform prompt management service supporting and ordering requests from multiple users across multiple platforms. In particular, a user input 822 may be received at a platform frontend 824. The platform frontend 824 passes the input to a prompt management service 826 that formalizes a prompt suitable for input to a generative output engine 828, which in turn can provide its output to an output router 860 that may direct generative output to a suitable destination. For example, the output router 860 may execute API requests generated by the generative output engine 828, may submit text responses back to the platform frontend 824, may wrap a text output of the generative output engine 828 in an API request to update a backend of the platform associated with the platform frontend 824, or may perform other operations.

Specifically, the user input 822 (which may be an engagement with a button, typed text input, spoken input, chat box input, and the like) can be provided to a graphical user interface 832 of the platform frontend 824. The graphical user interface 832 can be communicably coupled to a security gateway 834 of the prompt management service 826 that may be configured to determine whether the user input 822 is authorized to execute and/or complies with organization-specific rules.

The security gateway 834 may provide output to a prompt selector 836 which can be configured to select a prompt template from a database of preconfigured prompts, templatized prompts, or engineered templatized prompts. Once the raw user input is transformed into a string prompt, the prompt may be provided as input to a request queue 838 that orders different user request for input from the generative output engine 828. Output of the request queue 838 can be provided as input to a prompt hydrator 840 configured to populate template fields, add context identifiers, supplement the prompt, and perform other normalization operations described herein. In other cases, the prompt hydrator 840 can be configured to segment a single prompt into multiple discrete requests, which may be interdependent or may be independent.

Thereafter, the modified prompt(s) can be provided as input to an output queue at 842 that may serve to meter inputs provided to the generative output engine 828.

These foregoing embodiments depicted in FIGS. 8A-8B and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

Figure 9A:
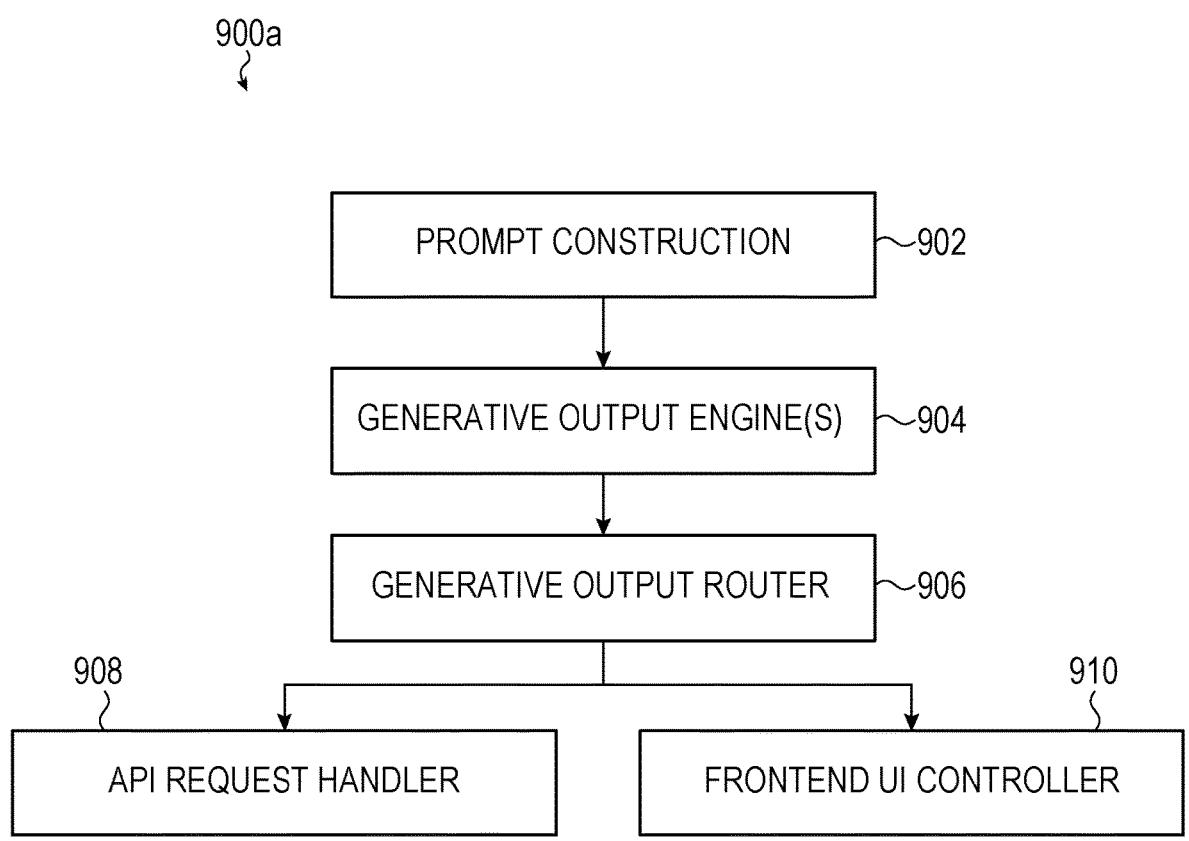
FIG. 9A depicts a simplified system diagram and data processing pipeline.

For example, although many constructions are possible, FIG. 9A depicts a simplified system diagram and data processing pipeline as described herein. The system 900a receives user input, and constructs a prompt therefrom at operation 902. After constructing a suitable prompt, and populating template fields, selecting appropriate instructions and examples for an LLM to continue, the modified constructed prompt is provided as input to a generative output engine 904. A continuation from the generative output engine 904 is provided as input to a router 906 configured to classify the output of the generative output engine 904 as being directed to one or more destinations. For example, the router 906 may determine that a particular generative output is an API request that should be executed against a particular API (e.g., such as an API of a system or platform as described herein). In this example, the router 906 may direct the output to an API request handler 908. In another example, the router 906 may determine that the generative output may be suitably directed to a graphical user interface/frontend. For example, a generative output may include suggestions to be shown to a user below a user's partial input, for example for an input as shown in FIGS. 2A-5.

Figure 9B:
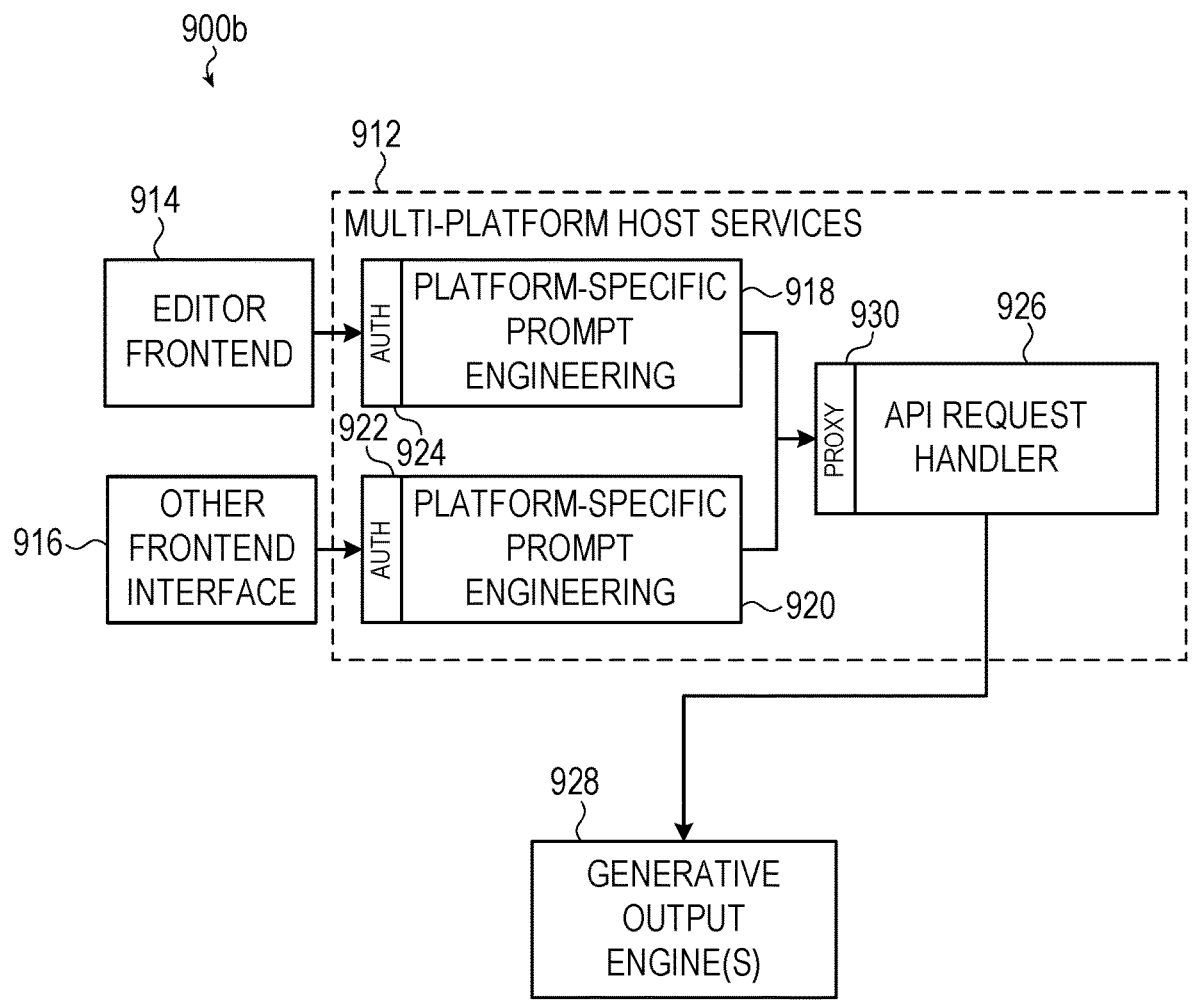
FIG. 9B depicts a system providing multiplatform prompt management as a service.

Another example architecture is shown in FIG. 9B, illustrating a system providing prompt management, and in particular multiplatform prompt management as a service. The system 900b is instantiated over cloud resources, which may be provisioned from a pool of resources in one or more locations (e.g., datacenters). In the illustrated embodiment, the provisioned resources are identified as the multi-platform host services 912.

The multi-platform host services 912 can receive input from one or more users in a variety of ways. For example, some users may provide input via an editor region 914 of a frontend, such as described above. Other users may provide input by engaging with other user interface elements 916 unrelated to common or shared features across multiple platforms. Specifically, the second user may provide input to the multi-platform host services 912 by engaging with one or more platform-specific user interface elements. In yet further examples, one or more frontends or backends can be configured to automatically generate one or more prompts for continuation by generative output engines as described herein. More generally, in many cases, user input may not be required and prompts may be requested and/or engineered automatically.

The multi-platform host services 912 can include multiple software instances or microservices each configured to receive user inputs and/or proposed prompts and configured to provide, as output, an engineered prompt. In many cases, these instances—shown in the figure as the platform-specific prompt engineering services 918, 920—can be configured to wrap proposed prompts within engineered prompts retrieved from a database such as described above.

In many cases, the platform-specific prompt engineering services 918, 920 can be each configured to authenticate requests received from various sources. In other cases, requests from editor regions or other user interface elements of particular frontends can be first received by one or more authenticator instances, such as the authentication instances 922, 924. In other cases, a single centralized authentication service can provide authentication as a service to each request before it is forwarded to the platform-specific prompt engineering services 918, 920.

Once a prompt has been engineered/supplemented by one of the platform-specific prompt engineering services 918, 920, it may be passed to a request queue/API request handler 926 configured to generate an API request directed to a generative output engine 928 including appropriate API tokens and the engineered prompt as a portion of the body of the API request. In some cases, a service proxy 930 can interpose the platform-specific prompt engineering services 918, 920 and the request queue/API request handler 926, so as to further modify or validate prompts prior to wrapping those prompts in an API call to the generative output engine 928 by the request queue/API request handler 926 although this is not required of all embodiments.

These foregoing embodiments depicted in FIGS. 8A-8B and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

More generally, it may be appreciated that a system as described herein can be used for a variety of purposes and functions to enhance functionality of collaboration tools. Detailed examples follow. Similarly, it may be appreciated that systems as described herein can be configured to operate in a number of ways, which may be implementation specific.

For example, it may be appreciated that information security and privacy can be protected and secured in a number of suitable ways. For example, in some cases, a single generative output engine or system may be used by a multiplatform collaboration system as described herein. In this architecture, authentication, validation, and authorization decisions in respect of business rules regarding requests to the generative output engine can be centralized, ensuring auditable control over input to a generative output engine or service and auditable control over output from the generative output engine. In some constructions, authentication to the generative output engine's services may be checked multiple times, by multiple services or service proxies. In some cases, a generative output engine can be configured to leverage different training data in response to differently-authenticated requests. In other cases, unauthorized requests for information or generative output may be denied before the request is forwarded to a generative output engine, thereby protecting tenant-owned information within a secure internal system. It may be appreciated that many constructions are possible.

Additionally, some generative output engines can be configured to discard input and output one a request has been serviced, thereby retaining zero data. Such constructions may be useful to generate output in respect of confidential or otherwise sensitive information. In other cases, such a configuration can enable multi-tenant use of the same generative output engine or service, without risking that prior requests by one tenant inform future training that in turn informs a generative output provided to a second tenant. Broadly, some generative output engines and systems can retain data and leverage that data for training and functionality improvement purposes, whereas other systems can be configured for zero data retention.

In some cases, requests may be limited in frequency, total number, or in scope of information requestable within a threshold period of time. These limitations (which may be applied on the user level, role level, tenant level, product level, and so on) can prevent monopolization of a generative output engine (especially when accessed in a centralized manner) by a single requester. Many constructions are possible.

Figure 10:
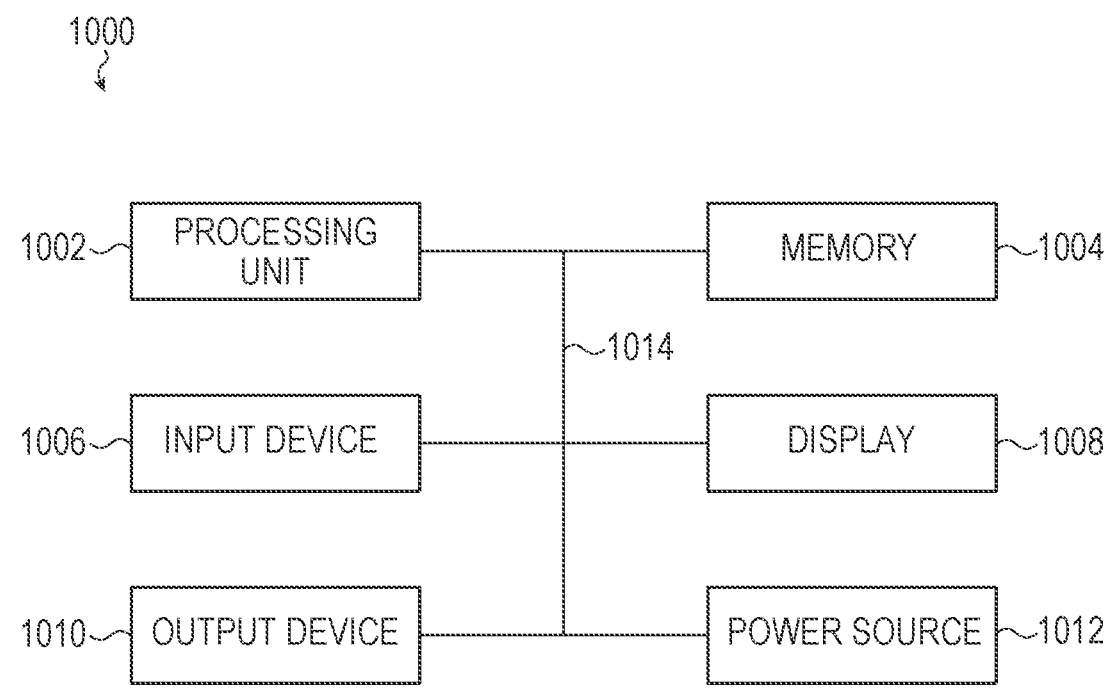
FIG. 10 shows a sample electrical block diagram of an electronic device that may perform the operations described herein.

FIG. 10 shows a sample electrical block diagram of an electronic device 1000 that may perform the operations described herein. The electronic device 1000 may in some cases take the form of any of the electronic devices described with reference to FIGS. 1-9, including client devices, and/or servers or other computing devices associated with the system 100. The electronic device 1000 can include one or more of a processing unit 1002, a memory 1004 or storage device, input devices 1006, a display 1008, output devices 1010, and a power source 1012. In some cases, various implementations of the electronic device 1000 may lack some or all of these components and/or include additional or alternative components.

The processing unit 1002 can control some or all of the operations of the electronic device 1000. The processing unit 1002 can communicate, either directly or indirectly, with some or all of the components of the electronic device 1000. For example, a system bus or other communication mechanism 1014 can provide communication between the processing unit 1002, the power source 1012, the memory 1004, the input device(s) 1006, and the output device(s) 1010.

The processing unit 1002 can be implemented as any electronic device capable of processing, receiving, or transmitting data or instructions. For example, the processing unit 1002 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 1000 can be controlled by multiple processing units. For example, select components of the electronic device 1000 (e.g., an input device 1006) may be controlled by a first processing unit and other components of the electronic device 1000 (e.g., the display 1008) may be controlled by a second processing unit, where the first and second processing units may or may not be in communication with each other.

The power source 1012 can be implemented with any device capable of providing energy to the electronic device 1000. For example, the power source 1012 may be one or more batteries or rechargeable batteries. Additionally, or alternatively, the power source 1012 can be a power connector or power cord that connects the electronic device 1000 to another power source, such as a wall outlet.

The memory 1004 can store electronic data that can be used by the electronic device 1000. For example, the memory 1004 can store electronic data or content such as, for example, audio and video files, documents and applications, device settings and user preferences, timing signals, control signals, and data structures or databases. The memory 1004 can be configured as any type of memory. By way of example only, the memory 1004 can be implemented as random access memory, read-only memory, flash memory, removable memory, other types of storage elements, or combinations of such devices.

In various embodiments, the display 1008 provides a graphical output, for example associated with an operating system, user interface, and/or applications of the electronic device 1000 (e.g., a chat user interface, an issue-tracking user interface, an issue-discovery user interface, etc.). In one embodiment, the display 1008 includes one or more sensors and is configured as a touch-sensitive (e.g., single-touch, multi-touch) and/or force-sensitive display to receive inputs from a user. For example, the display 1008 may be integrated with a touch sensor (e.g., a capacitive touch sensor) and/or a force sensor to provide a touch- and/or force-sensitive display. The display 1008 is operably coupled to the processing unit 1002 of the electronic device 1000.

The display 1008 can be implemented with any suitable technology, including, but not limited to, liquid crystal display (LCD) technology, light emitting diode (LED) technology, organic light-emitting display (OLED) technology, organic electroluminescence (OEL) technology, or another type of display technology. In some cases, the display 1008 is positioned beneath and viewable through a cover that forms at least a portion of an enclosure of the electronic device 1000.

In various embodiments, the input devices 1006 may include any suitable components for detecting inputs. Examples of input devices 1006 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 1006 may be configured to detect one or more particular types of input and provide a signal (e.g., an input signal) corresponding to the detected input. The signal may be provided, for example, to the processing unit 1002.

As discussed above, in some cases, the input device(s) 1006 include a touch sensor (e.g., a capacitive touch sensor) integrated with the display 1008 to provide a touch-sensitive display. Similarly, in some cases, the input device(s) 1006 include a force sensor (e.g., a capacitive force sensor) integrated with the display 1008 to provide a force-sensitive display.

The output devices 1010 may include any suitable components for providing outputs. Examples of output devices 1010 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device of the output devices 1010 may be configured to receive one or more signals (e.g., an output signal provided by the processing unit 1002) and provide an output corresponding to the signal.

In some cases, input devices 1006 and output devices 1010 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 1002 may be operably coupled to the input devices 1006 and the output devices 1010. The processing unit 1002 may be adapted to exchange signals with the input devices 1006 and the output devices 1010. For example, the processing unit 1002 may receive an input signal from an input device 1006 that corresponds to an input detected by the input device 1006. The processing unit 1002 may interpret the received input signal to determine whether to provide and/or change one or more outputs in response to the input signal. The processing unit 1002 may then send an output signal to one or more of the output devices 1010, to provide and/or change outputs as appropriate.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described, and whether or not such features are presented as being a part of a described embodiment. Thus, the breadth and scope of the present invention should not be limited by any of the above-described exemplary embodiments but is instead defined by the claims herein presented.

Furthermore, the foregoing examples and description of instances of purpose-configured software, whether accessible via API as a request-response service, an event-driven service, or whether configured as a self-contained data processing service are understood as not exhaustive. The various functions and operations of a system, such as described herein, can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference to an implementation in which discrete functions of the system are implemented as discrete microservices. It is appreciated that this is merely one possible implementation.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

What is claimed is:

1. A computer-implemented method for content summary generation within a content collaboration system, the method comprising:
   causing generation of a graphical user interface of the content collaboration system, the graphical user interface including one or more selectable graphical objects for a platform of the content collaboration system, wherein each selectable graphical object is user-selectable to cause redirection to a respective target content item and display content extracted from the target content item;
   in response to receiving a first user input with respect to a selectable graphical object of the one or more selectable graphical objects:
      providing, to a database of the content collaboration system, a request for content associated with the selectable graphical object;
      obtaining, from the database, at least a portion of the content; and
      causing, within the graphical user interface, generation of a window displaying the at least a portion of the content and one or more metadata associated with the content; and
   in response to receiving a second user input requesting a summary of the content:
      generating a summary-generation prompt comprising at least the content;
      providing the summary-generation prompt to a generative output engine using an application program interface call;
      obtaining a generative response from the generative output engine responsive to the application program interface call; and
      causing generation, within the window, of a natural language summary string from at least a portion of the generative response.

2. The computer-implemented method of claim 1, further comprising:
   causing generation of an action object within the window, the action object selectable to initiate performance of an action to generate content incorporating the natural language summary string, wherein the platform is a first platform, and the action object is for the first platform or a second platform different from the first platform;
   in response to receiving a third user input selecting the action object, performing the action to generate and display the generated content of the content collaboration system that includes at least a portion of the natural language summary string; and in response to receiving a fourth user input selecting a save action, storing the generated content that includes the at least a portion of the natural language summary string.

3. The computer-implemented method of claim 2, further comprising:
in response to receiving the third user input selecting the action object, determining one or more portions of the natural language summary string are mappable to one or more references of the content collaboration system; and
replacing each portion of the one or more portions of the natural language summary string with a respective reference of the one or more references, wherein the one or more references comprise one or more references to a person name, a team name, a page, a ticket, a board, or a card of the content collaboration system.

4. The computer-implemented method of claim 1, where the application program interface call is a first application program interface call, and the generative response is a first generative response, the method further comprising:
in response to receiving a natural language query string at an input field of the graphical user interface:
generating a query prompt comprising at least the natural language query string and at least a portion of the natural language summary string;
providing the query prompt to the generative output engine using a second application program interface call;
obtaining a second generative response from the generative output engine responsive to the second application program interface call; and
causing generation, within the window, of a natural language query response string from at least a portion of the second generative response.

5. The computer-implemented method of claim 4, further comprising:
causing generation, within the window, of the natural language query string associated with the natural language query response string.

6. The computer-implemented method of claim 1, further comprising:
in response to receiving the generative response from the generative output engine, wherein the generative response includes an object identifier:
identifying an object of the content collaboration system based at least in part on the object identifier of the generative response; and
causing generation, within the window, of the natural language summary string and the identified object.

7. The computer-implemented method of claim 1, wherein the selectable graphical object of the one or more selectable graphical objects is a first selectable graphical object, and the window that includes the natural language summary string further includes a second selectable graphical object to cause redirection to content of the platform.

8. The computer-implemented method of claim 7, further comprising:
causing generation, within the window, of the second selectable graphical object to cause redirection to content of the platform based on at least a portion of the generative response.

9. The computer-implemented method of claim 7, wherein the platform is a first platform of the content collaboration system, and the second selectable graphical object is to cause redirection to a second platform of the content collaboration system.

10. The computer-implemented method of claim 1, further comprising:
obtaining, from the database, the one or more metadata associated with the content; and
causing generation, within the window, of the natural language summary string and an indication of the one or more metadata associated with the content.

11. The computer-implemented method of claim 1, further comprising:
generating the summary-generation prompt comprising at least the content obtained from the database, wherein the summary-generation prompt is based at least in part on a permission of a user.

12. The computer-implemented method of claim 1, wherein the natural language summary string provides a summary of one or more of a page of a documentation platform, or an issue of an issue tracking platform, or a message thread of a communication platform.

13. The computer-implemented method of claim 1, wherein the content comprises one or more of natural language text, an image, or a video.

14. A content collaboration system, comprising:
a first interface configured to communicate with at least one client device;
a second interface configured to communicate with a generative output engine;
a database; and
a centralized summary generation service coupled with the first interface and the second interface, the centralized summary generation service configured to:
cause generation of a graphical user interface at a client device of the at least one client device, the graphical user interface including one or more selectable graphical objects for a platform of the content collaboration system, wherein each selectable graphical object is user-selectable to cause redirection to a respective target content item and display content extracted from the target content item;
in response to receiving a first user input via the first interface selecting a selectable graphical object of the one or more selectable graphical objects:
provide, to the database, a request for content associated with the selectable graphical object;
obtain, from the database, at least a portion of the content; and
cause generation, within the graphical user interface, of a window displaying the at least a portion of the content and one or more metadata associated with the content; and
in response to receiving a second user input requesting a summary of the content:
generate a summary-generation prompt comprising at least the content;
provide the summary-generation prompt to the generative output engine using an application program interface call;
obtain a generative response from the generative output engine responsive to the application program interface call; and
cause generation, within the window, of a natural language summary string from at least a portion of the generative response.

15. The content collaboration system of claim 14, wherein the centralized summary generation service is further configured to:
cause generation of an action object within the window via the first interface, the action object selectable to initiate performance of an action to generate content incorporating the natural language summary string, wherein the platform is a first platform, and the action object is for the first platform or a second platform different from the first platform;

in response to receiving, via the first interface, a third user input selecting the action object, perform the action to generate and display the generated content of the content collaboration system that includes at least a portion of the natural language summary string; and in response to receiving, via the first interface, a fourth user input selecting a save action, store the generated content that includes the at least a portion of the natural language summary string.

16. The system of claim 15, wherein the centralized summary generation service is further configured to:

in response to receiving the third user input, determine one or more portions of the natural language summary string are mappable to one or more references of the content collaboration system; and replace each portion of the one or more portions of the natural language summary string with a respective reference of the one or more references.

17. The system of claim 16, wherein the one or more references comprise one or more references to a person name, a team name, a page, a ticket, a board, or a card of the content collaboration system.

18. The system of claim 14, where:

the application program interface call is a first application program interface call;

the generative response is a first generative response; and the centralized summary generation service is further configured to, in response to receiving, via the first interface, a natural language query string at an input field of the graphical user interface:

generate, at the centralized summary generation service, a query prompt comprising at least the natural language query string and at least a portion of the natural language summary string;

provide, via the second interface, the query prompt to the generative output engine using a second application program interface call;

obtain, via the second interface, a second generative response from the generative output engine responsive to the second application program interface call; and cause generation, via the first interface and within the window, of a natural language query response string from at least a portion of the second generative response.

19. The system of claim 14, wherein:

the generative response includes an object identifier; and the centralized summary generation service is further configured to, in response to receiving the generative response from the generative output engine:

identify an object of the content collaboration system based at least in part on the object identifier of the generative response; and cause generation, via the first interface and within the window, of the natural language summary string and the identified object.

20. A computer-implemented method for content summary generation within a content collaboration system, the method comprising:

causing generation of a graphical user interface of the content collaboration system, the graphical user interface including one or more selectable graphical objects for a platform of the content collaboration system, wherein each selectable graphical object is user-selectable to cause redirection to a respective target content item and display content extracted from the respective target content item;

in response to receiving a first user input selecting a selectable graphical object of the one or more selectable graphical objects:

providing, to a database of the content collaboration system, a request for content associated with the selectable graphical object;

obtaining, from the database, at least a portion of the content; and causing, within the graphical user interface, generation of a window displaying the at least a portion of the content and one or more metadata associated with the content; and in response to receiving a second user input requesting a summary of the content:

generating a summary-generation prompt comprising at least the content;

providing the summary-generation prompt to a generative output engine using an application program interface call;

obtaining a generative response from the generative output engine responsive to the application program interface call;

causing generation of a natural language summary string within the window, the natural language summary string from at least a portion of the generative response;

causing generation of an action object within the window, the action object selectable to initiate performance of an action to generate content incorporating the natural language summary string;

in response to receiving a third user input selecting the action object:

determining one or more portions of the natural language summary string are mappable to one or more references of the content collaboration system; and replacing each portion of the one or more portions of the natural language summary string with a respective reference of the one or more references, wherein the one or more references comprise one or more references to a person name, a team name, a page, a ticket, a board, or a card of the content collaboration system; and performing the action to generate and display the generated content of the content collaboration system that includes at least a portion of the natural language summary string; and in response to receiving, via the graphical user interface, a fourth user input selecting a save action, storing the generated content that includes the at least a portion of the natural language summary string and the one or more references.

* * * * *